United States Patent [19]

Nakano et al.

[11] Patent Number: 5,166,238

[45] Date of Patent: Nov. 24, 1992

[54] STYRENE-BASED RESIN COMPOSITION

[75] Inventors: Akikazu Nakano; Toshihiro Furusawa; Toshikazu Ijitsu; Masakazu Suzuki, all of Chiba, Japan; Nobuhide Ishihara, Oxford, United Kingdom; Masahiko Kuramoto, Chiba, Japan; Hiroshi Uchida, Chiba, Japan; Azuma Komeiji, Chiba, Japan; Keisuke Funaki, Chiba, Japan; Takashi Sumitomo, Chiba, Japan

[73] Assignee: Idemitsu Kosan Co., Ltd., Tokyo, Japan

[21] Appl. No.: 524,372

[22] Filed: May 15, 1990

Related U.S. Application Data

[63] Continuation-in-part of Ser. No. 492,206, Mar. 12, 1990, abandoned, and a continuation-in-part of Ser. No. 423,602, Oct. 16, 1989, abandoned, and a continuation-in-part of Ser. No. 358,353, May 11, 1989, abandoned, said Ser. No. 492,206, is a continuation of Ser. No. 347,182, May 3, 1989, abandoned, which is a continuation of Ser. No. 185,515, Apr. 25, 1988, abandoned, said Ser. No. 423,602, is a continuation of Ser. No. 268,159, Nov. 7, 1988, abandoned.

[30] Foreign Application Priority Data

| Sep. 22, 1986 | [JP] | Japan | 61-222092 |
| May 18, 1987 | [JP] | Japan | 64-118880 |
| Dec. 4, 1987 | [JP] | Japan | 62-305837 |
| Jan. 13, 1988 | [JP] | Japan | 63-3847 |
| Jan. 14, 1988 | [JP] | Japan | 63-004921 |
| Jan. 14, 1988 | [JP] | Japan | 63-004922 |
| Jan. 14, 1988 | [JP] | Japan | 63-004924 |

[51] Int. Cl.$^5$ .............. C08K 5/527; C08K 5/524; C08K 5/13
[52] U.S. Cl. ............... 524/120; 264/288.4; 264/290.2; 524/147; 524/151; 524/153; 526/348.1; 526/347.2
[58] Field of Search ............ 524/153, 151, 147, 120; 526/347.3, 348.1; 264/288.4, 290.2

[56] References Cited

U.S. PATENT DOCUMENTS

| 3,039,993 | 6/1962 | Friedman | 524/120 |
| 3,069,406 | 12/1962 | Newman et al. | 526/348.1 |
| 3,175,465 | 12/1963 | Orloff et al. | 524/147 |
| 3,622,530 | 11/1971 | Branchesi . | |
| 4,680,353 | 7/1987 | Ishihara et al. | 526/348.1 |
| 4,774,301 | 9/1988 | Campbell et al. | 526/347.2 |
| 4,959,435 | 9/1990 | Seitz et al. | 526/347.2 |

FOREIGN PATENT DOCUMENTS

| 210615 | of 0000 | European Pat. Off. . |
| 0291915 | 11/1988 | European Pat. Off. . |
| 0342234 | 11/1989 | European Pat. Off. . |
| 2145214 | 2/1973 | France . |
| 46-8988 | 3/1971 | Japan . |
| 62-104818 | 5/1987 | Japan . |
| 62-257948 | 11/1987 | Japan . |
| 62-257950 | 11/1987 | Japan . |
| 63-77905 | 4/1988 | Japan . |

OTHER PUBLICATIONS

Seizo Okamura et al., *Introduction to Makromol. Chem.* (May 1, 1970) Kagakudojin pp. 40–48.
N. Ishikara et al., *Macromolecules* 19, 2464–2465 (1986).
Chemical Abstracts, vol. 108, No. 18, May 2, 1988, Abstract No. 151633h.
Plastics Engineering, vol. 32, No. 10, Oct. 1976, pp. 51–57, "Additives for Plastics–Antioxidants."
Chemical Abstracts, vol. 108, No. 18, May 2, 1988, Abstract No. 151651n.

*Primary Examiner*—Veronica P. Hoke
*Attorney, Agent, or Firm*—Oblon, Spivak, McClelland, Maier & Neustadt

[57] ABSTRACT

The present invention relates to a styrene-based resin composition comprising a styrene-based polymer having mainly a syndiotactic configuration and a specified antioxidant, a fibrous molding or extrusion produced by spinning a syndiotactic styrene resin composition and a molding produced by shaping and/or spinning, and stretching said resin.

34 Claims, 1 Drawing Sheet

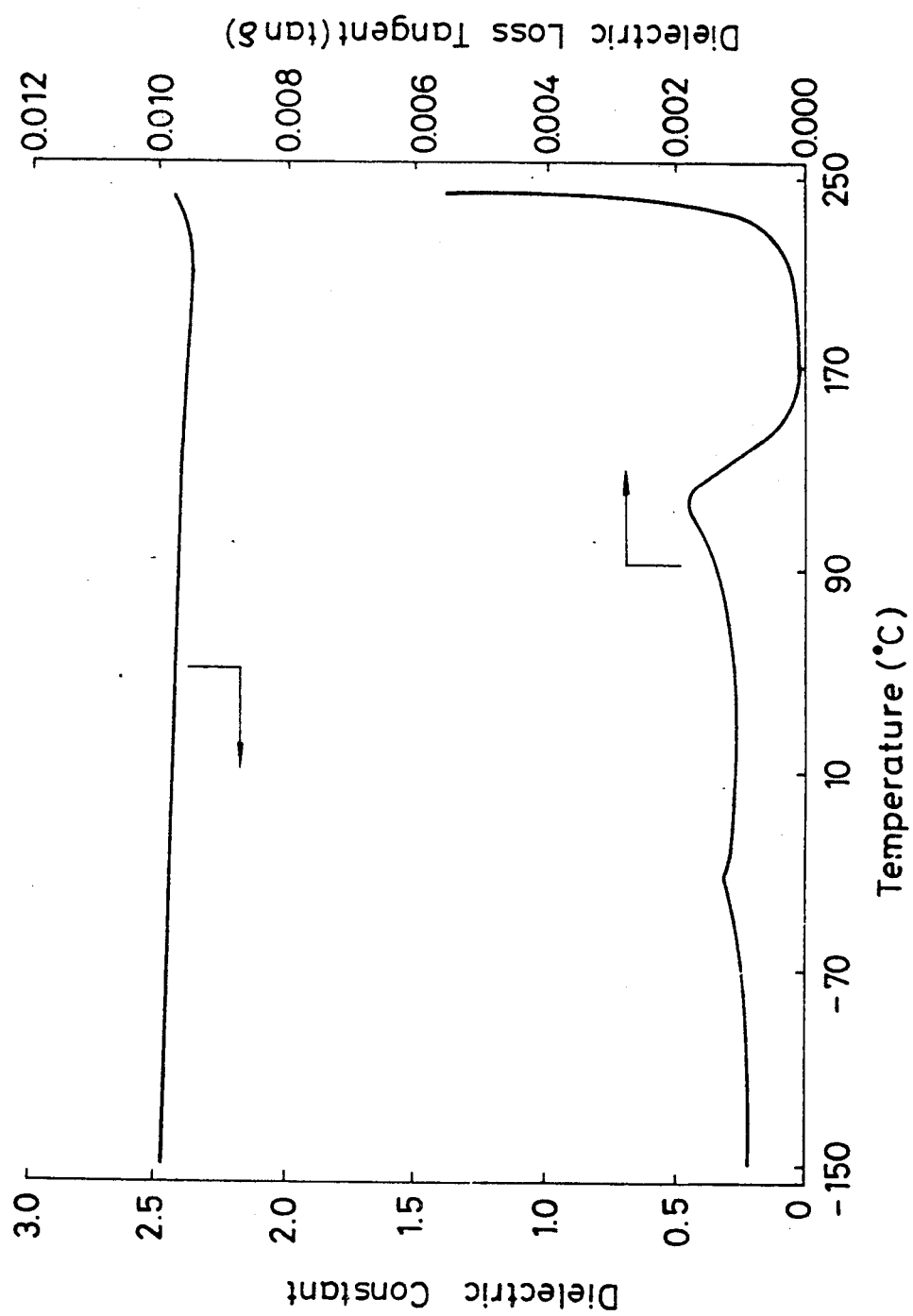

STYRENE-BASED RESIN COMPOSITION

This application is: (1) A continuation in part of Ser. No. 07/492,206 filed Mar. 12, 1990 (abandoned) which is a con of Ser. No. 07/347,182 filed May 3, 1989 (abandoned); which is a continuation of Ser. No. 07/185,515 filed Apr. 25, 1988 (abandoned); (2) a continuation in part of Ser. No. 07/423,602 filed Oct. 16, 1989 (aban); which is a continuation in part of Ser. No. 07/268,159 filed Nov. 7, 1988 (aban); and (3) a continuation in part of Ser. No. 07/358,353 filed May 11, 1989 (abandoned) (National Phase of PCT/JP87/00891).

BACKGROUND OF THE INVENTION

1. Field of the Invention

The present invention relates to a syndiotactic styrene-based resin composition having excellent heat stability. This invention is hereinafter referred to as the "first invention". The styrene-based resin composition of the first invention can be used widely and effectively as heat resistant structural materials and further as various industrial materials, mechanical part materials and so on for which heat resistance is required.

The present invention further relates to a fibrous molding (e.g. melt or wet extruded "spun" fibers) produced from syndiotactic polystyrene and, in particular, the composition of the first invention. These fibrous moldings are excellent in heat resistance, chemical resistance and so on and thus can be used effectively as a heat resistant fiber, a marine material, a material for use in production of apparatuses for chemicals, and so on. This invention is hereinafter referred to as the "second invention".

The present invention further relates to a "stretched" molding preferably produced from the composition of the first invention, which is excellent in heat resistance and mechanical strength and thus can be used in various applications, such as in production of electric materials, wrapping films, car parts and so on. This invention is hereinafter referred to as the "third invention".

The third invention relates to stretched styrene-based resin moldings and a process for the production thereof. More particularly, it is concerned with stretched styrene-based resin moldings which are excellent in heat resistance, solvent resistance, chemical resistance, electric insulating properties, mechanical strength, modulus of elasticity, dimensional stability and transparency, and consequently can be used in various applications; and a process for efficiently producing these stretched styrene-based resin moldings.

In a very preferred embodiment of the stretched resin invention a shaped article of a styrene-based polymer is prepared by drawing a styrene-based polymer having a mainly syndiotactic structure and a weight-average molecular weight of at least 100,000 and having at least 85% syndiotacticity in the racemic pentad as (determined by nuclear magnetic resonance spectrometric analysis using a carbon isotope). This material is excellent in the mechanical strength such as elastic modulus, impact strength and the like and heat resistance.

2. Description of the Related Art

Styrene-based polymers are generally divided into three groups depending on the configuration thereof: isotactic, syndiotactic and atactic. It is known that a styrene-based polymer having an atactic configuration is obtained by the usual radical polymerization method, and a styrene-based polymer having an isotactic configuration is obtained by using a Ziegler-type catalyst.

In general, styrene polymers which have been hitherto used are those having atactic configuration as obtained by radical polymerization. However, improvement in physical properties by stretching such atactic styrene polymers cannot be expected.

Styrene polymers having isotactic configuration are also known, and attempts to stretch them have been made (Kobunshi Kagaku (Polymer Chemistry) 21, 206 (1964)). However, a satisfactory stretching effect in such isotactic styrene polymers cannot be obtained because the rate of crystallization is slow and the main chain composed of carbon-carbon bonds in the styrene polymers has a spiral structure.

Applicants hereof have developed a styrene-based polymer having a syndiotactic configuration which is obtained by using a titanium compound and a water modified organoaluminum compound (Japanese Patent Application Laid-Open No. 104818/1987). See also U.S. Pat. No. 4,680,353. Styrene-based polymers having a syndiotactic configuration must be molded at elevated temperatures because they have an especially high melting point as compared with styrene polymers having the other configurations. However, molding at high temperatures causes a reduction in molecular weight due to thermal decomposition of the polymer and this results in a reduction of advantageous mechanical properties of the syndiotactic polymer.

Known methods to prevent reduction in mechanical properties due to thermal decomposition of styrene polymers during molding thereof, include adding a triphosphite, a diphosphite or a phenolic antioxidant to the styrene polymer (usually having an atactic configuration). However, these antioxidants commonly used in atactic polystyrene, evaporate or are thermally decomposed at the temperatures at which syndiotactic polystyrene is molded and, therefore, they cannot be used with syndiotactic polystyrene.

It has now been found that certain anti-oxidants can be added to a styrene polymer having a syndiotactic configuration to prepare a styrene-based resin composition having excellent heat resistance. Based on the findings, the first invention has been completed.

The second invention relates to a fibrous molding or "spun" fiber of a syndiotactic polystyrene composition and not particularly to a fibrous molding or fiber of the composition of the first invention. The fiber may be stretched to further enhance the properties of the fiber.

A fibrous molding has heretofore been produced from thermoplastic resins. Such thermoplastic resins include polyethylene, polypropylene, polyethylene terephthalate, polyamide and so on. None of these thermoplastic resins, however, are satisfactorily high in heat resistance, chemical resistance and so on. Moreover they have disadvantages in that many of them are adversely effected by steam while others are expensive.

A styrene-based polymer having a syndiotactic configuration has advantages in that the starting materials are inexpensive, the melting point is high and chemical resistance is excellent. However fibrous moldings (or fibers) retaining the advantageous properties thereof, have not been produced from such styrene-based polymers.

It has been found that a fiber produced from a styrene-based polymer having a syndiotactic configuration which contains the antioxidants of the first invention hereof, by various spinning methods, has the desired heat resistance and chemical resistance. Based on the findings, the second invention has been completed.

As noted above, mixing other resins, rubber, or inorganic fillers into polymers, or stretching, has been attempted for the purpose of improving thermal properties and mechanical properties of polymers. Particularly for a styrene-based polymer, these techniques are widely applied because styrene-based polymers are generally poor in impact resistance.

That is, the styrene-based polymer which has heretofore been in general use is obtained by radical polymerization, and its configuration is atactic and further it is amorphous. Thus the impact resistance and mechanical strength of the styrene-based polymer are not sufficiently high. In order to overcome these problems, other resins and so on have been compounded to the styrene polymer, but the effect of improvement is not sufficiently high. Moreover, since the styrene-based polymer is atactic configuration, an improvement of physical properties thereof due to strain-induced crystallization cannot be expected.

Also as noted above, attempts were made to stretch a styrene-based polymer the configuration of which is isotactic (Kobunshi Kagaku (Polymer Chemistry), 21, 206 (1964)). However, since the styrene-based polymer is slow in a crystallization rate and its crystal structure is spiral, a substantially sufficient stretching effect cannot be obtained.

The present inventors have made extensive investigations in order to overcome the above problems. In the course of the investigations, since a styrene-based polymer of high syndiotacticity which has been developed by the present applicant (Japanese Patent Application Laid-Open No. 104818/1987) has a high melting point (160° to 310° C.), compounding other resins and so on, or stretching has been attempted. For example, (1) blending a styrene-based polymer having a syndiotactic configuration and a thermoplastic resin (Japanese Patent Application Laid-Open No. 257950/1987), (2) a composition comprising a styrene-based polymer having a syndiotactic configuration and an inorganic filler (Japanese Patent Application Laid-Open No. 257948/1987), and so forth have been proposed.

However, the above compositions containing a styrene-based polymer having a syndiotactic configuration and the stretched product cannot be said to have satisfactory properties when thermal properties and mechanical strength of stretched films, bottles and so on in practical use as produced by film molding, blow molding and so on are taken into consideration.

Thus the third invention is intended to overcome the above problems and to provide a styrene-based resin composition having excellent heat resistance and mechanical strength by stretching film moldings of syndiotactic styrene polymers.

The third invention provides axial and biaxial sheets of defined composition and having been subjected to defined stretch rates.

BRIEF DESCRIPTION OF THE INVENTION

The first invention relates to a styrene-based resin composition comprising (A) a styrene-based polymer having mainly a syndiotactic configuration as resin component and (B) a phosphorus-containing antioxidant and a phenolic antioxidant as antioxidant wherein the total amount of the phosphorus-containing antioxidant and the phenolic antioxidant compounded is 0.005 to 5 parts by weight per 100 parts by weight of the styrene-based polymer, and the weight ratio of the phosphorus-containing antioxidant to the phenolic antioxidant (phosphorus-containing antioxidant phenolic antioxidant) is 100:1 to 0.3:1.

The second invention relates to a fibrous molding produced by spinning a syndiotactic polystyrene and especially the styrene-based resin composition of the first invention.

The third invention relates to a molding produced by stretching the styrene-based resin composition of the first invention. These moldings have excellent heat resistance, solvent resistance, chemical resistance, mechanical strength, modulus of elasticity, dimensional stability and transparency. They are also excellent in electric insulating properties, for instance, a breakdown voltage at 25° C. of at least 30 kV/mm.

The third invention also provides a process for efficiently producing stretched sytrene-based moldings.

BRIEF DESCRIPTION OF THE DRAWING

The FIGURE is a graph showing the temperature dependency of the dielectric constant and dielectric loss tangent of the film obtained in Example 10B.

DESCRIPTION OF THE PREFERRED EMBODIMENTS

The first invention will hereinafter be explained.

In the first invention, a styrene-based polymer having mainly a syndiotactic configuration is used as the resin component (A).

A styrene-based polymer having mainly a syndiotactic configuration means a polymer having configuration that with respect to a main chain comprising a carbon-carbon bond, phenyl groups or substituted phenyl groups as side chains are positioned alternately in the opposite directions. The tacticity is determined by the nuclear magnetic resonance method using a carbon isotope (the $^{13}$C-NMR method). The tacticity as determined by the $^{13}$C-NMR method can be indicated in proportions of the configuration neighboring constitutional units continuously bonded together, for example, diad when two units are continuously bonded together, triad when three units are continuously bonded together, and pentad when five units are continuously bonded together. The styrene-based polymer having mainly a syndiotactic configuration to be used in the first invention includes polystyrene, poly(alkyl-styrene), poly(halogenated styrene), poly(alkoxystyrene), poly(vinyl benzoate and their mixtures, and copolymers containing the above monomer as the main component. For general use, the copolymers each usually have a syndiotacticity that the diad is at least 75% and preferably at least 85%, or the pentad (racemic pentad) is at least 30% and preferably at least 50%. For specific use in the stretched polymer inventions described below, a copolymer having a racemic pentad of 85% or more is most preferred.

Typical examples of the poly(alkylstyrene) are polymethylstyrene, polyethylstyrene, polyisopropylstyrene, poly-tert-butylstyrene and the like. Typical examples of the poly(halostyrene) are polychlorostyrene, polybromostyrene, polyfluorostyrene and the like. Typical examples of the poly(alkoxystyrene) are polymethoxystyrene, polyethoxystyrene and the like. Particularly preferred examples of the styrene-based polymers are polystyrene, poly-p-methylstyrene, poly-m-methylstyrene, poly-p-tert-butylstyrene, poly-p-chlorostyrene, poly-m-chlorostyrene, poly-p-fluorostyrene, and a copolymer of styrene and p-methylstyrene.

The styrene-based polymer to be used in the first invention varies in molecular weight. The weight average molecular weight of the styrene-based polymer is preferably at least 10,000 and particularly preferably at least 50,000. If the weight average molecular weight is less than 10,000, the styrene-based polymer is not sufficiently high in heat resistance and mechanical strength, and the resulting composition is not sufficiently improved in heat resistance and mechanical strength. For specific use in the stretching inventions described below, a molecular weight of at least 100,000 and most preferably 300,000 is desirable.

The molecular weight distribution of the styrene-based polymer to be used in the first invention is not critical, and polymers having various distributions of molecular weight can be used.

A styrene-based polymer having mainly a syndiotactic configuration to be used as the resin (component (A)) has a melting point of 160° to 310° C., and thus is markedly superior in heat resistance to conventional styrene-based polymers having an atactic configurations.

The styrene-based polymer of this invention, having mainly a syndiotactic configuration, can be kneaded with other components such as general thermoplastic resin, the antioxidants, and other components to be added as required to prepare the composition of the first invention, under suitable kneading conditions. In general, they are melt kneaded using a Bumbury's mixer, a Henschel mixer, or a kneading roll.

In the first invention, as the antioxidant (B), a phosphorus-containing antioxidant and a phenolic antioxidant are used. As the phosphorus-containing antioxidant, various compounds, such as monophosphites and diphosphites, can be used. Typical examples of the monophosphite include tris(2,4-di-tert-butylphenyl) phosphite, tris(mono or di-nonylphenyl) phosphite and the like. As the diphosphite, diphosphite represented by the general formula;

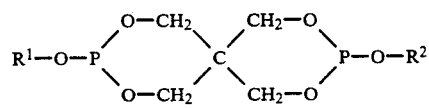

(wherein $R^1$ and $R^2$ may be the same or different and are each an alkyl group having 1 to 20 carbon atoms, a cycloalkyl group having 3 to 20 carbon atoms, or an aryl group having 6 to 20 carbon atoms) can be used.

Representative examples of the diphosphite include distearylpentaerythritol diphosphite, dioctylpentaerythritol diphosphite, diphenylpentaerythritol diphosphite, bis(2,4-di-tert-butylphenyl)pentaerythritol diphosphite, bis(2,6-di-tert-butyl-4-methylphenyl)pentaerythritol diphosphite, dicyclohexylpentaerythritol diphosphite, tetrakis(2,4-di-tert-butylphenyl)-4,4'biphenylene phosphite, and the like. As the phosphoruscontaining antioxidant of these compounds, tris(2,4-di-tert-butylphenyl) phosphite, bis(2,6-di-tert-butyl-4-methylphenyl)pentaerythritol diphosphite, bis(2,4-di-tertbutylphenyl)pentaerythritol diphosphite and tetrakis(2,4-di-tert-butylphenyl)-4,4'-biphenylene phosphite As the phenolic antioxidant, various compounds such as dialkylphenol, trialkylphenol, diphenylmonoalkoxyphenol and tetraalkylphenol can be used.

Representative examples of the dialkylphenol include 2,2'-methylenebis-(6-tert-butyl-4-methylphenol), 1,1-bis(5-tert-butyl-4-hydroxy-2-methylphenyl)butane, 2,2-methylenebis(4-methyl-6-cyclohexylphenol), 4,4'-thiobis(6-tert-butyl-3-methylphenol) and 2,2-bis-5-tert-butyl-4-hydroxy-2-methylphenyl)-4-n-dodecylmercaptobutane.

Representative examples of the trialkylphenol include 2,6-di-tert-butyl-4-methylphenol, 2,2'-methylene-bis(6-tert-butyl-4-ethylphenol), 2,2'-methylene-bis[4-methyl-6-(α-methylcyclohexyl)phenol], 2,2'-methylenebis-(4-methyl-6-nonylphenol), 1,1,3-tris(5-tert-butyl-4-hydroxy-2-methylphenyl)butane, ethylene glycol bis[3,3-bis(3-tert-butyl-4-hydroxyphenyl)butylate], 1,1-bis(3,5-dimethyl-2-hydroxyphenyl)-3-(n-dodecylthio)-butane, 1,3,5-tris-(3,5-di-tert-butyl-4-hydroxybenzyl)-2,4-6-trimethylbenzene, 2,2-bis-(3,5-di-tert-butyl-4-hydroxybenzyl)malonic acid dioctadecyl ester, n-octadecyl-3-(4-hydroxy-3,5-di-tertbutylphenyl)propionate, tetrakis[methylene(3,5-di-tert-butyl-4-hydroxyhydrocinnamate)]methane, 3,9-bis[1,1-dimethyl-2-{β-(3-tert-butyl-4-hydroxy-5-methylphenyl)propionyloxy}ethyl-2,4,8,10-tetraoxaspiro[5,5]undecane and tris-(3,5-di-tert-butyl-4-hydroxybenzyl)-isocyanurate.

Representative example of the diphenylmonoalkoxyphenol is 2,6-diphenyl-4-methoxyphenol.

Representative example of the tetraalkylphenol is tris-(4-tert-butyl-2,6-dimethyl-3-hydroxybenzyl-)isocyanurate.

Of the above compounds, as the phenolic antioxidant, trialkylphenol is preferred. In particular, n-octadecyl-3-(4-hydroxy-3,5-di-tert-butylphenyl)propionate, tetrakis[methylene(3,5-di-tert-butyl-4-hydroxyhydrocinnamate)]methane, 3,9-bis[1,1-dimethyl-2-{β-(3-tert-butyl-4-hydroxy-5-methylphenyl)propionyloxy}ethyl-2,4,8,10-tetraoxaspiro[5,5]undecane, and tris-(3,5-di-tert-butyl-4-hydroxybenzyl)-isocyanurate are preferred. In addition, tris-(4-tert-butyl-2,6-dimethyl-3-hydroxybenzyl)isocyanurate and the like are suitably used.

In the first invention, the above phosphorus-containing antioxidant and phenolic antioxidant ar added to the styrene-based polymer having mainly a syndiotactic configuration as the resin component (A) in such a manner that the total amount of the phosphorus-containing antioxidant and the phenolic antioxidant is 0.005 to 5 parts by weight, preferably 0.01 to 1 part by weight per 100 parts by weight of the styrene-based polymer. If the amount of the antioxidant component (B) compounded is less than 0.005 part by weight, no sufficient oxidation prevention effect can be obtained and the molecular weight drops. Except as discussed below wherein the produce is worked, more than 5 parts by weight is not necessary and may affect mechanical, heat resistance appearance and other properties.

The weight ratio of the phosphorus-containing antioxidant to the phenolic antioxidant is 100:1 to 0.3:1 and preferably 10:1 to 0.5:1.

The phosphorus-containing antioxidant has an ability to decompose peroxides and further has an ability to reproduce the phenolic antioxidant. If the amount of the phosphorus-containing antioxidant added is less than the above range, the effect of reproducing the phenolic antioxidant is sometimes poor.

The styrene-based resin composition of the present invention basically comprises the aforementioned components. The antioxidant component (B) may further contain a sulfur-containing antioxidant.

As the sulfur-containing antioxidant, thioether-based antioxidants are preferred. Representative examples are dilauryl-3,3'-thiodipropionate, dimyristyl-3,3'thiodipropionate, distearyl-3,3'-thiodipropionate, pentaerythritol tetrakis-($\beta$-lauryl-thiopropionate), bis[2-methyl-4-{3-n-alkylthiopropionyloxy}-5-tertbutylphenyl]sulfide and 2-mercaptobenzoimidazole. Of these compounds, pentaerythritol-tetrakis-($\beta$-laurylthiopropionate) is preferred.

The amount of sulfur-based antioxidant compounded is 0.0001 to 1 part by weight, preferably 0.001 to 0.5 parts by weight per 100 parts by weight of the styrene-based polymer having mainly a syndiotactic configuration.

When the phosphorus-containing antioxidant, the phenolic antioxidant and the sulfur-containing antioxidant are used, the ratio of the phosphorus-containing antioxidant to the sulfur-containing antioxidant to the phenolic antioxidant (phosphorus-containing antioxidant/sulfur-containing antioxidant/phenolic antioxidant) is 100:10:1 to 0.3:1:1 and preferably 50:10:1 to 0.5:1:1 and more preferably 10:10:1 to 1:1:1. The phosphorus-containing antioxidant and the sulfur-containing antioxidant have an ability to decompose peroxides and further have an ability to reproduce the phenolic antioxidant. If, however, the amount of the phosphorus-containing antioxidant and the sulfur-containing antioxidant is less than the above range, the effect of reproducing the phenolic antioxidant is sometimes low. The sulfur-containing antioxidant has a lower peroxide decomposition speed than the phosphorus-containing antioxidant, but its peroxide decomposition efficiency per molecule is high. Thus, when the sulfur-containing antioxidant is added, an excellent oxidation preventing effect can be obtained. When the above three antioxidants are used in combination, a styrene-based resin composition having markedly high heat stability is obtained.

In the first invention, when the above three antioxidants are used in combination as the antioxidant component (B), as the resin component (A), not only a styrene-based polymer alone but also a mixture of the styrene-based polymer and a thermoplastic resin and/or rubber may be used.

The above thermoplastic resin means a thermoplastic resin other than the styrene-based polymer having mainly a syndiotactic configuration.

As the above thermoplastic resin, various resins can be used according to application of the composition. For example, styrene-based polymers such as polystyrene having an atactic configuration, polystyrene having an isotactic configuration, an AS resin and an ABS resin can be used. In addition, polyesters such as polyethylene terephthalate, polycarbonate, polyethers such as polyphenyleneoxide, polysulfone and polyethersulfone, condensed polymers such as polyamide, polyphenylenesulfide (PPS) and polyoxymethylene, acryl-based polymers such as polyacrylic acid, polyacrylate and polymethyl methacrylate, polyolefins such as polyethylene, polypropylene, polybutene, poly(4-methylpentene-1) and an ethylene propylene copolymer, halogen-containing vinyl compound polymers such as polyvinyl chloride, polyvinylidene chloride, and polyvinylidene fluoride and the like can be used.

Of the above polymers, polystyrene having an atatic configuration, specifically general purpose polystyrene having a weight average molecular weight of 50,000 to 500,000 and a density of 1.04 to 1.065 g/cm³, an ABS resin, polyester, specifically polyethylene terephthalate having an intrinsic viscosity [$\eta$] of 0.4 to 1.5 dl/g, preferably 0.5 to 1.4 dl/g, a density of 1.33 to 1.40 g/cm³ and a melting point of 255° to 260° C., polycarbonate, specifically polycarbonate having a viscosity average molecular weight of 20,000 to 40,000, and a density of 1.19 to 1.22 g/cm³, polyether, specifically polyphenylene oxide having a weight average molecular weight of 5,000 to 10,000 and a density of 1.05 to 1.07 g/cm³ are suitable.

As the rubber, various types of rubbers can be used. The most suitable is a rubber-like copolymer containing a styrene-based compound as a component thereof. Examples are rubber (SEBS) in which the butadiene portion of a styrene-butadiene block copolymer is partially or completely hydrogenated, styrene-butadiene copolymer rubber (SBR), methyl acrylate-butadiene-styrene copolymer rubber, acrylonitrile-butadiene-styrene copolymer rubber (ABS rubber), acrylonitrilealkyl acrylate-butadiene-styrene copolymer rubber (AABS), methyl methacrylate-alkyl acrylate-styrene copolymer rubber (MAS), methyl methacrylate-alkyl acrylate-butadiene-styrene copolymer rubber (MABS) and the like. Since these rubber-like copolymers containing a styrene-based compound as a component contains a styrene unit, its dispersibility in a styrene-based polymer having mainly a syndiotactic structure is good. Thus it has a markedly high effect to improve physical properties.

Other examples of rubbers which can be used include natural rubber, polybutadiene, polyisoprene, polyisobutylene, neoprene, ethylene-propylene copolymer rubber, polysulfide rubber, thiokol rubber, acryl rubber, urethane rubber, silicone rubber, epichlorohydrin rubber, polyether-ester rubber and polyester-ester rubber.

In a case where the above mixture is used, the thermoplastic resin and/or the rubber is added in an amount 1 to 200 parts by weight, preferably 5 to 160 parts by weight and more preferably 25 to 120 parts by weight per 100 parts by weight of the styrene-based polymer having mainly a syndiotactic configuration. If the thermoplastic resin and/or the rubber compounded is less than 1 part by weight, there is no significant difference between the resulting mixture and the styrene-based polymer alone, having mainly a syndiotactic configuration. On the other hand, if it is more than 200 parts by weight, an improvement in mechanical and thermal properties due to the styrene-based polymer having mainly a syndiotactic configuration cannot be expected.

In the first invention, when the phosphorus-containing anitoxidant and the phenolic antioxidant are used as the antioxidant component (B), a mixture of a styrene-based polymer having mainly a syndiotactic configuration and rubber or a mixture of a styrene-based polymer having mainly a syndiotactic configuration, rubber and a thermoplastic resin may be used. As the rubber or the thermoplastic resin, those as listed above can be used.

When the above mixture is used, the rubber, or rubber and the thermoplastic resin is added in an amount of 1 to 200 parts by weight, preferably 5 to 160 parts by weight and more preferably 25 to 120 parts by weight per 100 parts by weight of the styrene based polymer having mainly a syndiotactic configuration. If the amount of the rubber, or rubber and the thermoplastic resin compounded is less than 1 part by weight, there is no significant difference between the resulting mixture and the styrene-based polymer alone, having mainly a syndiotactic configuration. On the other hand, if it is more than 200 parts by weight, an improvement in mechanical and thermal properties due to the styrene-based polymer having mainly a syndiotactic configuration cannot be expected.

The composition of the first invention basically comprises the aforementioned components. If necessary, an inorganic filler and various additives can be added.

As the inorganic filler, various compounds can be used. The inorganic filler can be chosen appropriately according to need. More specifically, glass fibers, carbon fibers, alumina fibers, carbon black, graphite, titanium dioxide, silica, talc, mica, calcium carbonate, calcium sulfate, barium carbonate, magnesium carbonate, magnesium sulfate, barium sulfate, oxysulfate, tin oxide, alumina, kaolin, silicon carbide, metal powder, and their mixtures can be used.

The second invention will hereinafter be explained.

The second invention provides, as described above, a fibrous molding produced by spinning a syndiotactic styrene based polystyrene and, in particular, the syndiotactic styrene-based composition of the first invention.

As with the first invention, a styrene-based polymer having mainly a syndiotactic configuration can be prepared, for example, by polymerizing a styrene-based monomer (corresponding to the above styrene-based polymer) by the use of a catalyst comprising a titanium compound and a condensate of water and trialkyl aluminum in an inert hydrocarbon solvent or in the absence of a solvent (Japanese Patent Application Laid-Open No. 187708/1987).

The resin composition to be used in production of the fibrous molding of the second invention basically comprises (A) the styrene-based polymer having mainly a syndiotactic configuration and, most preferably (B) an antioxidant. If necessary, other thermoplastic resins and various additives may be compounded thereto. The most preferred embodiment, the polystyrene compositions to be molded or spun into fibers are the same as in the first invention except that the antioxidant are added in amount of 0.01 to 30 parts by weight, preferably 0.1 to 25 parts by weight per 100 parts by weight of the syndiotactic styrene-based polymer.

Additives such as, a lubricants, oxidation stabilizers, and inorganic fillers and the like which have been used in order to increase spinning properties, stability and mechanical strength can be compounded with the syndiotactic polystyrene composition.

The fibrous molding of the second invention is an extruded fiber produced by spinning the aforementioned composition. As the spinning method, either melt spinning or wet spinning can be employed.

For melt spinning, the composition is melted by heating at least to its melting point and preferably no higher than its decomposition temperature; and extruding through a fine nozzle.

For wet spinning, the composition is dissolved in a solvent, gelled at the inlet of a nozzle and extruded. As the solvent to be used in the wet spinning, benzene, toluene, xylene, ethylbenzene, cyclohexane, decalin, N-methylpyrolidone, tetrahydrofuran, carbon tetrachloride, 1,1,2,2-tetrachloroethane, chloroform, dichloromethane, monochlorobenzene, dichlorobenzene, trichlorobenzene, trichlene and the like can be used.

The fibrous molding or spun fiber of the second invention (hereinafter sometimes referred to merely as a "fiber") is obtained as described above, which may be further subjected to stretching and heat treatment if necessary. This is a special embodiment of the invention more generally described as the third invention.

The method of stretching is not critical. For example, the fiber obtained by melt spinning can be stretched by controlling the winding speed, guide roller speed and extrusion speed. Similarly, a fiber obtained by wet spinning can be stretched in a wet condition in the same manner as in melt spinning.

As described below with respect to non-fibrous moldings (third invention) this stretching provides increased mechanical and thermal properties.

The rate of stretching is usually at least two times, and preferably at least three times.

Furthermore the fiber thus obtained can be heat treated or tempered at a temperature from the glass transition temperature of the fiber to the melting point of the fiber, preferably within the temperature range of from 20° C. higher than the glass transition temperature to the melting point. This heat treatment, improves or increases the heat resistance and chemical resistance of the fiber.

The fibrous molding or spun fiber thus obtained has a diameter (width) of 0.0001 to 2 mm and preferably 0.001 to 0.5 mm.

The third invention will hereinafter be explained.

The third invention, also provides a molding obtained by stretching the styrene-based resin composition described above.

The styrene-based resin composition to be used in the production of the molding of the third invention basically comprises (A) a styrene-based polymer having mainly a syndiotactic configuration and (B) an antioxidant and if necessary, it may further contain other thermoplastic resins, rubber, an inorganic filler and various additives. They are the same as described in the first invention.

That is, the styrene-based resin composition to be used in the third invention includes the styrene-based resin composition of the first invention and the styrene-based resin composition of the first invention in which the resin component (A) further contains a thermoplastic resin and/or rubber. As the thermoplastic resin and the rubber, those listed in the first invention can be used, and the amount of the thermoplastic resin or rubber compounded is the same as in the first invention.

The styrene-based resin composition to be used in the third invention may be a composition which contains (C) an inorganic filler in addition to the styrene-based composition of the first invention, and further it may be the styrene-based resin composition in which the resin component (A) contains a thermoplastic resin and/or rubber.

The inorganic filler (C) is not critical in form; that is, it may be fibrous, granular or powdered. Examples of fibrous inorganic fillers include glass fibers, carbon fibers, alumina fibers and the like. Particularly preferred are glass fibers and carbon fibers. The form of the glass fiber includes a cloth form, a mat form, a bundle cut form, a short fiber form and a filament form. It is preferred for the glass fiber to be of the bundle cut form and to have a length of 0.03 to 13 mm and a fiber diameter of 5 to 15 $\mu$m. Particularly preferably the glass fiber is subjected to silane treatment.

As the carbon fiber, a polyacrylonitrile (PAN)-based fiber is preferred. More preferably the carbon fiber is of the chopped fiber type and is a bundle of fibers each having a length of about 3 mm and a diameter of 7 to 15 $\mu$m.

As the granular or powdered inorganic filler those listed in the first invention are suitable including talc, carbon black, graphite, titanium dioxide, silica, mica, calcium carbonate, calcium sulfate, barium sulfate, magnesium carbonate, magnesium sulfate, barium sulfate, oxy sulfate, tin oxide, alumina, kaolin, silicon carbide, metal powder and the like. Talc, particularly having an average particle diameter of 0.3 to 2 μm is preferred for this invention.

The amount of the component (C) compounded is 0.001 to 10 parts by weight, preferably 0.03 to 5 parts by weight and more preferably 0.05 to 3 parts by weight per 100 parts by weight of the component (A). If the amount of the component (C) compounded is less than 0.001 part by weight, the crystallization accelerating and strength increasing effects cannot be obtained even if the inorganic filler is added. On the other hand, if it is more than 10 parts by weight, break-down occurs at the time of stretching and no uniform molding can be obtained.

The resin composition of the third invention is composed of the components (A) and (B), or the components (A), (B) and (C) as described above. If necessary, a metal inert agent, an ozone degradation preventing agent, a synergist and the like may be added to the resin composition of the third invention, alone or in combination with one another. In addition, a compatibilizing agent and a lubricant can be added if necessary.

The composition of the third invention is prepared by kneading the aforementioned components by the use of a kneader, a mixing roll, an extruder and the like, or by solution blending.

The molding of the third invention is obtained by stretching the above styrene-based resin composition.

The molding of the third invention is usually obtained by molding the above composition by extrusion molding, calendering and the like to produce a sheet for stretching, and then stretching the sheet. As the sheet for stretching, there can be used a dry mat or a wet mat which is obtained by dissolving the above components in a suitable solvent and casting or gelling the resulting solution. The type of the solvent is chosen depending on the type of the composition. For example, benzene, toluene, xylene, ethylbenzene, cyclohexane, decaline, N-methylpyrrolidone, tetrahydrofuran, carbon tetrachloride, chloroform, dichloromethane, tetrachloroethane, monochloro-benzene, dichlorobenzene, trichlorobenzene and the like can be used.

The thickness of the sheet is determined appropriately; it may be several ten micrometers or more than 500 μm. For this sheet, it is preferred for the degree of crystallization to be as low as possible. Particularly when a sheet having a high thickness is molded, it is desirable that the sheet be quickly cooled at the time of molding.

As the stretching method, any of (1) heat stretching, (2) gel stretching and (3) wet stretching can be employed. In the gel stretching or wet stretching, as the solvent, benzene, toluene, xylene, ethylbenzene, cyclohexane, decaline, N-methylpyrolidone, tetrahydrofuran, carbon tetrachloride, 1,1,2,2-tetrachloroethane, chloroform, dichloromethane, monochlorobenzene, dichlorobenzene, trichlorobenzene, trichlene and the like can be used.

In the case of the heat stretching, both uniaxial stretching and biaxial stretching can be employed. In the biaxial stretching, stretching may be carried out simultaneously in the machine direction and the transverse direction, or stretching may be carried out sequentially.

In the third invention, it is particularly preferred that the aforementioned sheet be heat stretched.

In the stretching of the sheet, the sheet is uniaxially or biaxially stretched while heating at a temperature from the second order transition temperature to a temperature 10° C. lower than the melting point. In the case of the uniaxial stretching, the sheet is stretched to at least 1.2 times, preferably 3 to 10 times the original length in the stretching direction. In the case of the biaxial stretching, the sheet is stretched to at least 1.2 times, preferably 3 to 10 times the original length in each stretching direction. If the stretching ratio is too small, the resulting molding such as a sheet, a film or a tape is not sufficiently improved physical properties.

In the third invention, particularly when the biaxial stretching is applied, the above composition can be directly subjected to inflation molding without formation of the sheet to produce a biaxially stretched molding (e.g., a biaxially stretched film). In this inflation molding, it is effective for preventing melt fracture, surface roughening and so on that the resin temperature be maintained at a temperature at least 20° C. higher than the melting point. In the inflation molding, uniaxial stretching is possible if the blow up ratio is made small.

By carrying out uniaxial stretching or biaxial stretching according to the third invention, a stretched molding having excellent physical properties is obtained. This molding can be further subjected to heat treatment after the stretching. This heat treatment is achieved by heating the stretched molding in a tension state within the temperature range of a temperature about 10° C. higher than the second order transition temperature (glass transition temperature) to the melting point. This heat treatment further increases heat resistance and dimensional stability of the stretched molding.

In one particularly preferred embodiment, material for producing the stretched moldings of the present invention, is a styrene-based resin having mainly syndiotactic configuration and a weight average molecular weight of at least 50,000, more preferably at least 100,000 and most preferably at least 300,000 is stretched. The syndiotactic configuration means a stereostructure in which phenyl groups or substituted phenyl groups as side chains are located alternately in opposite directions relative to the main chain composed of carbon-carbon bonds. The tacticity is quantitatively determined by the nuclear magnetic resonance method using a carbon isotope ($^{13}$C-NMR method). The tacticity as determined by the $^{13}$C-NMR method is indicated in terms of proportions of structural units continuously connected to each other, i.e., a diad in which two structural units are connected to each other, a triad in which three structural units are connected to each other, and a pentad in which five structural units are connected to each other. The styrene-based resin having mainly the syndiotactic configuration of the present invention includes polystyrene, poly(alkylstyrene), poly(halogenated styrene), poly(alkoxystyrene), polyvinyl benzoate and mixtures thereof, and copolymers containing the above polymer units as the main component and each having syndiotacticity such that the proportion of a diad is at least 75% and preferably at least 85%, or the proportion of a pentad (racemic pentad) is at least 30% and preferably at least 50%.

In the case of styrene-based resins with low (less than 30% in the racemic pentad) syndiotacticity, satisfactory stretching effect cannot be expected even if they are subjected to the stretching treatment.

The above poly(alkylstyrene) includes polymethylstyrene, polyethylstyrene, polyisopropylstyrene, poly(tert-butylstyrene) and the like. The poly(halogenated styrene) includes polychlorostyrene, polybromostyrene, polyfluorostyrene and the like. The poly(alkoxystyrene) includes polymethoxystyrene, polyethoxystyrene and the like. Of these styrene-based resins polystyrene, poly(p-methylstyrene), poly(m-methylstyrene), poly(p-tert-butylstyrene), poly(p-chlorostyrene), poly(m-chlorostyrene), poly(p-fluorostyrene), and a copolymer of styrene and p-methylstyrene are most preferable.

In general, the definitions for the first invention are applicable here. Also, as noted above, the styrene-based resin to be used in this embodiment should have a weight average molecular weight of at least 50,000, preferably at least 100,000, most preferably at least 300,000.

Although the molecular weight distribution is not critical, if the weight average molecular weight is less than 50,000 difficulties such as breakage in stretching operation have been noted and they prevent optimal stretching. The result is that a stretched molding having highest mechanical strength and heat resistance cannot be obtained. On the other hand, very favorable high strength and elastic modulus properties are obtained when the average molecular weight is above 100,000 and in particular, above 300,000.

Thus, for the third invention, it is preferred that the styrene-based polymer have a weight-average molecular weight of at least 100,000 and most preferably above 300,000 combined with a syndiotacticity of at least 85% in the racemic pentad as determined by nuclear magnetic resonance spectrometric analysis using a carbon isotope.

The composition of the first invention can be used although an improvement in strength, etc. can be accomplished without the antioxidant composition.

The styrene-based resin having mainly syndiotactic configuration can be obtained as described above, for example, by polymerizing a styrene-based monomer (corresponding to the desired styrene-based resin) by the use of a catalyst comprising a titanium compound and a condensate of water and trialkylaluminum in the presence or absence of an inert hydrocarbon solvent (Japanese Patent Application Laid-Open No. 187708/1987).

In the present embodiment, the aforementioned styrene-based resin having high syndiotactic configuration is used as the material for the stretched molding. In addition, materials as prepared by adding other polymers (e.g., styrene-based resins having atactic configuration, styrene-based resin having isotactic configuration, low molecular weight styrene-based resins having syndiotactic configuration, and polymers other than the styrene-based resins), inorganic powders such as metal powder, talc and mica, inorganic fibers such as glass fiber, an antistatic agent, a lubricant, an anti-clouding agent, a heat stabilizer, a dye, a pigment and the like to the above styrene-based resin having mainly syndiotactic configuration can be used. The amount of the other polymer, inorganic powder, inorganic fiber or additive to be used is 0.0005 to 10 parts by weight and preferably 0.001 to 5 parts by weight and most preferably 0.01 to 3 parts by weight per 100 parts by weight of the styrene-based resin having mainly syndiotactic configuration.

In the present embodiment, the styrene-based resin having mainly syndiotactic configuration or material obtained by compounding other components thereto is used as a raw material and is molded by extrusion molding, calender molding, blow molding or injection molding and so forth to produce a sheet (film or preliminary molding) and tube for stretching. In this case, the raw material is usually melted by heating and molded in the desired form by the use of various molding machines, but the raw material may be molded in a softened state without heat melting. The melting temperature of the raw material is usually preferably nor lower than the melting point to not higher than the decomposition point of the styrene-based polymer used or compounds thereof. For instance, when the styrene-based polymer is polystyrene the melting temperature is 260° to 350° C. and preferably 280° to 330° C. If the temperature is too high, undesirable problems occur, such as decomposition of the raw material. Thickness of the sheet is not critical and is usually chosen from the range of not more than 5 mm, preferably 3 mm to 20 μm. If the thickness is in excess of 5 mm, the sheet sometimes becomes difficult to stretch due to internal crystallization. The crystallinity of the sheet (film) is not more than 25%, preferably not more than 15% and most preferably not more than 10%.

An effective way to produce a sheet having the lowest crystallinity as possible, particularly a sheet having a large thickness, is that the raw material which has been heat melted be quenched at the time of molding. The temperature of the coolant in this quenching is desirably adjusted to a temperature of 10° C. or more, preferably 20° C. or more and further preferably 30° C. or more lower than the glass transition temperature of the styrene-based polymer or compounds thereof. For instance, when the styrene-based polymer is polystyrene, the temperature is not higher than 80° C., preferably not higher than 70° C., and most preferably not more than 60° C. The quenching rate is from 200° to 3° C./sec., preferably from 200° to 5° C./sec. and most preferably from 200° to 10° C./sec. If the temperature of the coolant is too high and quenching rate is too low, cooling becomes slow and the material becomes turbid as a result of partial crystallization.

The thickness of the sheet for stretching as obtained above is not critical. It is preferred, however, that the unevenness in thickness be minimized. More specifically, it should be controlled to be not more than 15% and particularly preferably not more than 5%. Surface irregularities are preferably controlled to be not more than 1 μm (measured according to JIS B0601).

The sheet is generally stretched uniaxially or biaxially while heating at a temperature of from glass transition temperature of the raw material to a temperature 10° C. lower than the melting point thereof. A temperature of the glass transition temperature to the cold crystallization temperature of it is preferred. Therein stretching rate is preferably 100%/min. to 500,000%/min. In the case of uniaxial stretching, the sheet should be stretched at a draw ratio of at least 2, preferably 3 to 10. In the case of biaxial srretching, the sheet should be stretched at a draw ratio of at least 1.2, preferably at least 1.5, more preferably 2.5 to 8.5, most preferably 3 to 5 in each direction. If the draw ratio is too small physical properties of sheet, film or tape of the stretched molding are not satisfactorily improved. In the case of biaxial stretching, the sheet may be stretched simultaneously in the machine direction (MD) and transverse direction (TD), or may be stretched successively in the desired order.

In the present invention, particularly in the case of biaxial stretching, the raw material can be subjected to inflation molding or stretching blow molding directly without formation of a sheet or preliminary molding to produce a biaxially stretched molding (e.g., a biaxially stretched film). In this inflation molding or stretching blow molding, it is effective so as to prevent melt fracture, roughness of surface and the like that the resin be maintained at a temperature of at least 20° C. higher than its melting point. If, however, the melt temperature is too high, the decomposition of the resin proceeds in molding. Therefore, the melt temperature is preferably lower than the decomposition point. When the styrene-based polymer is polystyrene, for instance, the melt temperature is usually adjusted to the range of 270° to 330° C., preferably 280° C. to 300° C. In the inflation molding, where stretching is effected immediately after molten extrusion, the stretching temperature is preferably 5° to 150° C. lower and more preferably 10° to 100° C. lower than the melting point. In the case of stretching blow molding, the preform before stretching may be either a hot parison or a cold parison. In inflation molding or stretching blow molding, if the blow-up ratio is decreased, uniaxial stretching is realized.

Uniaxial stretching or biaxial stretching according to the present invention provides a stretched molding having excellent heat resistance, solvent resistance, chemical resistance, mechanical properties and electric insulating properties. It is also effective that the stretched molding is further annealed (heated) at a temperature of 10° C. or more higher than the glass transition temperature to a temperature of 5° C. or more lower than the melting point, for example, at a temperature of 120° to 250° C. Improvement in heat resistance and so forth cannot be expected if the annealing temperature is lower than a temperature of 10° C. higher than the glass transition temperature. On the other hand, problems such as melting of a part or the whole if it is in excess of a temperature of 5° C. lower than the melting point. The annealing time is usually 1 second to 100 hours preferably 5 seconds to 100 hours and most preferably 20 seconds to 10 hours. The annealing is usually carried out in the air atmosphere or in an atmosphere of inert gas such as argon and nitrogen. It is more effective during the annealing the stretched molding in a state of tension. This annealing further increases heat resistance, dimensional stability and so forth of the stretched molding.

When the styrene-based resin is stretched and molded into a wrapping material or container according to the present invention, a transparent stretched molding can be obtained, the contents of which can be seen and maintains heat resistance and solvent resistance of the raw material because the styrene-based resin used as the raw material has high syndiotacticity and transparency such that the haze is not more than 30.%

Moreover, a stretched molding can be obtained which is excellent in electric properties such as electric insulating properties (e.g., a breakdown voltage (BDV) at 25° C. of at least 30 kV/mm) and dielectric properties.

Accordingly, the molding of the present invention can be used as a food wrapping material (e.g., sheet, film or bottle), a housing material for electric or electronic parrs, a wrapping material, and further as an electric insulator, e.g., condenser, cable and transverter and other industrial films.

In the more preferred embodiment of the present invention, a shaped article having excellent physical properties is obtained by subjecting the above described styrene-based polymer wherein the average molecular weight is at least 100,00 and most preferably 300,000, to a drawing treatment. As described above, the drawing treatment may be performed either by the uniaxial drawing or by the biaxial drawing. However, the drawing ratio should preferably be at least 200% in the uniaxial drawing and at least 150% in each direction in the biaxial drawing while a drawing ratio of 300 to 500% gives the best result in each case. The temperature in the drawing treatment should desirably be a temperature somewhat higher than the glass transition temperature of the styrene-based polymer. The starting sheet material subjected to the drawing treatment should preferably have a thickness of about 50 to 500 $\mu$m as obtained by extrusion molding or calendering. As described above, when the drawing treatment is inflation molding or stretching, the temperature should be maintained at about 20° C. above the melting point of the styrene-based resin so that the biaxial drawing can be performed with good productivity.

The drawing treatment carried out in this manner is followed, if desired, by a thermal fixing treatment. In this case, the film after drawing is thermally fixed in a tensioned condition at a temperature in the range between the melting point and a temperature higher than the glass transition temperature by about 70° C. This thermal fixing treatment has an effect to increase the heat resistance and dimensional stability of the film as drawn.

Further, shaping of fibers as drawn can be undertaken under the same conditions as described above. In addition to such a melting drawing, wet drawing and gel drawing can also be undertaken.

In summary, as described above, in detail, wet drawing or gel drawing should be performed, with solvents including benzene, toluene, xylene, ethyl benzene, cyclohexane, Decalin, N-methyl pyrrolidone, tetrahydrofuran, carbon tetrachloride, chloroform, dicholoro methane, monochlofo benzene, dichloro benzene, trichloro benzene, trichlene and the like. Further, the drawing treatment may optionally be performed of a styrene-based polymer having a syndiotactic structure admixed with a styrene-based polymer having an atactic structure, a styrene-based polymer having an isotactic structure or a styrene-based polymer of a low molecular weight having a syndiotactic structure and further with a suitable amount of an antistatic agent, lubricant, antifogging agent, heat stabilizer, dye, pigment, metal powder and inorganic fine powder such as talc, mica and the like.

Thus the composition of the first invention has good heat stability and can be used widely and effectively as a material in applications where high heat resistance and high chemical resistance are required. The fibrous molding of the second invention which can use the type of compostion of the first invention, maintains heat resistance inherent of the styrene-based polymer having mainly a syndiotactic configuration, is insoluble in acids, alkalis and organic solvents, and is greatly improved in chemical resistance. The fibers of the second invention can be stretched, to impove their properties. The third invention involves stretching, a styrene-based resin molding, such as a film, a sheet or a tape, to improve heat resistance and mechanical strength such as tensile modulus and tensile strength. Furthermore, in the third invention, when an inorganic filler is added, there can be obtained a molding having further increased heat resistance.

EXAMPLES OF THE INVENTION

The following examples will further illustrate the present invention.

EXAMPLES (ILLUSTRATING THE INVENTION)

Preparation Example 1 (Preparation of Polystyrene Having Syndiotactic Configuration)

In toluene solvent 8 l of styrene was polymerized in the presence of a catalyst comprising 2.67 mmol of tetraethoxytitanium and 267 mmol (in terms of aluminum atom) of methylaluminoxane at 40° C. for 2.5 hours. The polymer thus obtained was washed and, then dried. The yield of the polymer was 490 g. Then the polymer was subjected to Soxhlet's extraction with methyl ethyl ketone to obtain 97 wt. % of the extraction residue.

The polymer thus obtained as the extraction residue had a weight average molecular weight of 1,500,000 and a melting point of 270° C. In the analysis by nuclear magnetic resonance ($^{13}$C—NMR) method of isotopic carbon, an absorption owing to the syndiotactic configuration was observed at 145.35 ppm. The syndiotacticity (pentad) calculated from the peak area was 96%.

Example 1

One hundred parts by weight of the polystyrene prepared in the above Preparation Example 1 was dry-blended with 0.5 part by weight of bis(2,4-di-t-butylphenyl)pentaerythritol diphosphite as the phosphorus-containing antioxidant and 0.2 part by weight of n-octadecyl-3-(4-hydroxy-3,5-di-t-butylphenyl)propionate as the phenolic antioxidant. Then the mixture was kneaded at 300° C. in the air for 2 min and extruded. The weight-average molecular weight of the thus obtained extrusion moldings was determined according to a gel permeation chromatography using 1,2,4-trichlorobenzene as the solvent at 135° C. The results are shown in Table 1.

Example 2

The same procedure as in Example 1 was repeated except that 0.2 part by weight of tetrakis[methylene(3,5-di-t-butyl-4-hydroxyhydrocinnamate)]methane was used as the phenolic antioxidant. The results are shown in Table 1.

Example 3

The same procedure as in Example 1 was repeated except that 0.5 part by weight of bis(2,6-di-t-butyl-4-methylphenyl)pentaerythritol diphosphite was used as the phosphorus-containing antioxidant. The results are shown in Table 1.

Example 4

The same procedure as in Example 1 was repeated except that 0.5 part by weight of bis(2,6-di-t-butyl-4-methylphenyl)pentaerythritol diphosphite was used as the phosphorus-containing antioxidant and 0.2 part by weight of tetrakis[methylene(3,5-di-t-butyl-4-hydroxyhydrocinnamage)]methane was used as the phenolic antioxidant. The results are shown in Table 1.

Examples 5 to 9

The same procedure as in Example 1 was repeated except that bis(2,4-di-t-butylphenyl)pentaerythritol diphosphite as the phosphorus-containing antioxidant and tetrakis[methylene(3,5-di-t-butyl-4-hydroxyhydrocinnamate)]methane as the phenolic antioxidant were used in amounts shown in Table 1 for 100 parts by weight of the polystyrene prepared in the above Preparation Example 1 to obtain the results shown in Table 1.

Comparative Example 1

The same procedure as in Example 1 was repeated except that 1.0 part by weight of bis(2,4-di-t-butylphenyl)-pentaerythritol was used as the phosphorus-containing compound for 100 parts by weight of the polystyrene prepared in the above preparation Example 1. The results are shown in Table 1.

Comparative Example 2

The same procedure as in Comparative Example 1 was repeated except that 1.0 part by weight of bis(2,6-di-t-butyl-4-methylphenyl)pentaerythritol diphosphite was used as the phosphorus-containing compound. The results are shown in Table 1.

Comparative Example 3

The same procedure as in Comparative Example 1 was repeated except that 0.4 part by weight of n-octadecyl-3-(4-hydroxy-3,5-di-t-butylphenyl)propionate was used as the phenolic antioxidant. The results are shown in Table 1.

Comparative Example 4

The same procedure as in Comparative Example 1 was repeated except that 0.4 part by weight of tetrakis-[methylene(3,5-di-t-butyl-4-hydroxyhydrocinnamate)]methane was used as the phenolic antioxidant. The results are shown in Table 1.

Comparative Example 5

The same procedure as in Comparative Example 1 was repeated except that 0.5 part by weight of 4,4-thiobis(6-t-butyl-3-methylphenol) was used as the anti-oxidant. The results are shown in Table 1.

Referential Example

The same procedure as in Example 1 was repeated except that no stabilizer (neither phosphorus-containing antioxidant nor phenolic antioxidant) was used. The results are shown in Table 1.

TABLE 1

| | Syndiotactic polystyrene (parts by weight) | Antioxidant (parts by weight) | | | Weight average molecular weight |
|---|---|---|---|---|---|
| | | Phosphorus-containing antioxidant | Phenolic antioxidant | Sulfur-containing antioxidant | |
| Example 1 | 100 | 0.5 *1 | 0.2 *3 | — | 510,000 |
| Example 2 | " | 0.5 *1 | 0.2 *4 | — | 570,000 |
| Example 3 | " | 0.5 *2 | 0.2 *3 | — | 520,000 |
| Example 4 | " | 0.5 *3 | 0.2 *4 | — | 500,000 |

TABLE 1-continued

| | Syndiotactic polystyrene (parts by weight) | Antioxidant (parts by weight) | | | Weight average molecular weight |
|---|---|---|---|---|---|
| | | Phosphorus-containing antioxidant | Phenolic antioxidant | Sulfur-containing antioxidant | |
| Example 5 | " | 0.25 *1 | 0.3 *4 | — | 480,000 |
| Example 6 | " | 0.75 *1 | 0.1 *4 | — | 770,000 |
| Example 7 | " | 1.0 *1 | 0.4 *4 | — | 750,000 |
| Example 8 | " | 0.25 *1 | 0.1 *4 | — | 480,000 |
| Example 9 | " | 0.375 *1 | 0.05 *4 | — | 530,000 |
| Comparative Example 1 | " | 1.0 *1 | — | — | 390,000 |
| Comparative Example 2 | " | 1.0 *2 | — | — | 370,000 |
| Comparative Example 3 | " | — | 0.4 *3 | — | 220,000 |
| Comparative Example 4 | " | — | 0.4 *4 | — | 230,000 |
| Comparative Example 5 | " | — | — | 0.5 *5 | 310,000 |
| Referential Example | " | — | — | — | 200,000 |

Footnote
Phosphorus-containing antioxidant:
*1; bis(2,4-di-t-butylphenyl)pentaerythritol diphosphite
*2; bis(2,6-di-t-butyl-4-methylphenyl)pentaerythritol diphosphite
Phenolic antioxidant:
*3; n-octadecyl-3-(4-hydroxy-3,5-di-t-butylphenyl)-propionate
*4; tetrakis(methylene(3,5-di-t-butyl-4-hydroxyhydro-cinnamate))methane
Sulfur-containing antioxidant;
*5; 4,4'-thiobis(6-t-butyl-3-methylphenol)

Example 10

One hundred parts by weight of the syndiotactic polystyrene prepared in Preparation Example 1 were dry-mixed with 0.5 part by weight of bis-(2,6-di-tert-butyl-4-methylphenyl)pentaerythritol diphosphite serving as the phosphorus-based antioxidant, 0.2 part by weight of tetrakis[methylene-(3,5-di-tert-butyl-4-hydroxyhydro-cinnamate)]methane as the phenolic antioxidant and 0.3 part by weight of pentaerythritol tetrakis(β-laurylthiopropionate) as the sulfur-containing antioxidant. The mixture was then kneaded together at 300° C. for 2 minutes in the air, and was extruded. The weight-average molecular weight of the extrusion moldings was measured by the gel permeation chromatography (GPC) at 135° C., using 1,2,4-trichlorobenzene as the solvent. The results are shown in Table 2.

Examples 11 to 15

Experiments were carried out in a similar manner as described in Example 10, except that the type and amount of the antioxidants used were varied, as specified in Table 2. The results are set out in Table 2.

Comparative Example 6

Experimentation was conducted in a similar manner as described in Example 10, except that only the phosphorus-containing antioxidant was used as the antioxidant in an mount of 1.0 parts by weight. The results are given in Table 2.

Example 16

Fifty parts by weight of the syndiotactic polystyrene prepared in Preparation Example 1 were blended with 50 parts by weight of atactic polystyrene (manufactured by Idemitsu Petrochemical Co., Ltd. and available in the trade name of Idemitsu Polystyrene US-305) that was a thermoplastic resin, and the blend was dry-mixed with 0.5 part by weight of bis(2,6-di-tert-butyl-4-methylphenyl)-pentaerythritol diphosphite serving as the phosphorus-containing antioxidant, 0.2 part by weight of tetrakis-[methylene-(3,5-di-tert-butyl-4-hydroxyhydrocinnamate)]-methane as the phenolic antioxidant and 0.3 part by weight of pentaerythritol-tetrakis(β-laurylthiopropionate) as the sulfur-containing antioxidant. Then, the mixture was kneaded together at 300° C. for 2 minutes in the air and extruded, and the obtained extrusion moldings was Soxhlet-extracted using methyl ethyl ketone (MEK) as the solvent to obtain 50% by weight of the extraction residue. The weight-average molecular weight of the extraction residue was determined at 135° C. by GPC using 1,2,4-trichlorobenzene as the solvent. The results are given in Table 2.

Comparative Example 7

Experimentation was carried out in a similar manner as described in Example 16, except that only the phosphorus-containing antioxidant was used as the anti-oxidant in an amount of 1.0 parts by weight. The results are given in Table 2.

Example 17

Fifty parts by weight of the syndiotactic polystyrene prepared in Preparation Example 1 were blended with 50 parts by weight of polycarbonate (having a viscosity-average molecular weight of 23,000, manufactured by Idemitsu Petrochemical Co., Ltd. and available in the trade name of Idemitsu Polycarbonate A-2500) that was a thermoplastic resin, and the blend was dry-mixed with 0.5 part by weight of bis(2,6-di-tert-butyl-4-methylphenyl)pentaerythritol diphosphite serving as the phosphorus-containing antioxidant, 0.2 part by weight of tetrakis-[methylene(3,5-di-tert-butyl-4-hydroxyhydrocinnamate)]methane as the phenolic antioxidant and 0.3 part by weight of pentaerythritol-tetrakis(β-laurylthiopropionate) as the sulfur-containing antioxidant. Then, the mixture was kneaded together at 300° C. for 2 minutes in the air and extruded. The weight-average molecular weight of the obtained extrusion moldings was determined at 135° C. by GPC using 1,2,4-trichlorobenzene as the solvent. The results are given in Table 2.

Example 18 amount of the thermoplastic resins used were varied, as specified in Table 2. The results are given in Table 2.

TABLE 2

| | Resin component (parts by weight) | | Antioxidant (parts by weight) | | | Weight-average molecular weight |
|---|---|---|---|---|---|---|
| | s-PS *1 | Thermoplastic resin or Rubber | Phosphorus-containing antioxidant | Phenolic antioxidant | Sulfur-containing antioxidant | |
| Example 10 | 100 | 0 | 0.5 *8 | 0.2 *11 | 0.3 *13 | 870,000 |
| Example 11 | 100 | 0 | 0.5 *9 | 0.2 *11 | 0.3 *13 | 830,000 |
| Example 12 | 100 | 0 | 0.5 *10 | 0.2 *11 | 0.3 *13 | 860,000 |
| Example 13 | 100 | 0 | 0.5 *8 | 0.2 *12 | 0.3 *13 | 840,000 |
| Comparative Example 6 | 100 | 0 | 1.0 *8 | — | — | 370,000 |
| Example 14 | 100 | 0 | 1.0 *8 | 0.5 *11 | 0.5 *13 | 920,000 |
| Example 15 | 100 | 0 | 0.005 *8 | 0.0025 *11 | 0.0025 *13 | 790,000 |
| Example 16 | 50 | a-PS *2 50 | 0.5 *8 | 0.2 *11 | 0.3 *13 | 900,000 |
| Comparative Example 7 | 50 | a-PS *2 50 | 1.0 *8 | — | — | 370,000 |
| Example 17 | 50 | PC *3 50 | 0.5 *8 | 0.2 *11 | 0.3 *13 | 840,000 |
| Example 18 | 50 | PPO *4 50 | 0.5 *8 | 0.2 *11 | 0.3 *13 | 820,000 |
| Example 19 | 50 | PPS *5 50 | 0.5 *8 | 0.2 *11 | 0.3 *13 | 800,000 |
| Example 20 | 50 | PET *6 50 | 0.5 *8 | 0.2 *11 | 0.3 *13 | 880,000 |
| Example 21 | 90 | MAS *7 10 | 0.5 *8 | 0.2 *11 | 0.3 *13 | 840,000 |

Footnotes
*1 s-PS: Syndiotactic polystyrene prepared in Preparation Example 1.
*2 a-PS: Atactic polystyrene (manufactured by Idemitsu Petrochemical Co., Ltd., and available in the trade name of Idemitsu Polystyrene US-305).
*3 FC: Polycarbonate (having a viscosity-average molecular weight of 23,000, manufactured by Idemitsu Petochemical Co., Ltd., and available in trade name of Idemitsu Polycarbonate A-2500).
*4 PPO: Polyphenylene oxide (having a weight-average molecular weight of 7,200, manufactured by Scientific Polymer Products, Inc., and available under Catalog No. V-100).
*5 PPS: Polyphenylene sulfide (manufactured by Phillips, Co., Ltd., and available in the trade name of Ryton F-4).
*6 PET: Polyethylene terephthalate (having an intrinsic viscosity ($\eta$) of 0.78 dl/g, manufactured by Mitsubishi Rayon, Co., Ltd., and available in the trade name of Dianite MA-523).
*7 MAS: Copolymer of methyl methacrylate-n-butyl acrylate-styrene (manufactured by Rohm & Haas, Co., Ltd., and available in the trade name of Methaburene KM-330).
Phosphorus-containing antioxidant
*8: Bis(2,6-di-tert-butyl-4-methylphenyl)pentaerythritol diphosphite
*9: Tris(2,4-di-tert-butylphenyl)phosphite
*10: Tetrakis(2,4-di-tert-butylphenyl)-4,4'-biphenylene phosphite Phenolic antioxidant.
*11: Tetrakis(methylene-(3,5-di-tert-butyl-4-hydroxy-hydrocinnamte))methane
*12: n-octadecyl-3-(4-hydroxy-3,5-di-tert-butylphenyl)-propionate Sulfur-containing antioxidant
*13: Pentaerythritol-tetrakis($\beta$-lauryl-thiopropionate)

Experimentation was carried out in a similar manner as described in Example 17, except that the thermoplastic resin used was one specified in Table 2. The results are given in Table 2.

Example 19

Fifty parts by weight of the syndiotactic polystyrene prepared in Preparation Example 1 were blended with 50 parts by weight of polyphenylene sulfide (manufactured by Phillips, Co., Ltd., and available in the trade name of Ryton P-4) that was a thermoplastic resin, and the blend was dry-mixed with 0.5 part by weight of bis(2,6-di-tert-butyl-4-methylphenyl)-pentaerythritol diphosphite serving as the phosphorus-containing antioxidant, 0.2 part by weight of tetrakis[methylene(3,5-di-tert-butyl-4-hydroxyhydrocinnamate)]methane as the phenolic antioxidant and 0.3 part by weight of pentaerythritol-tetrakis($\beta$-laurylthiopropionate) as the sulfur-containing antioxidant. Then, the mixture was kneaded together at 300° C. for 2 minutes in the air and extruded, and the obtained extrusion moldings was Soxhlet-extracted using 1,2,4-trichlorobenzene as the solvent to obtain 50% by weight of extraction residue. The weight-average molecular weight of the extraction residue was determined at 135° C. by GPC using 1,2,4-trichlorobenzene as the solvent. The results are given in Table 2.

Examples 20 and 21

Experiments were carried out in a similar manner as described in Example 19, except that the type and amount of the thermoplastic resins used were varied, as specified in Table 2. The results are given in Table 2.

Example 22

Fifty parts by weight of ABS resin (trade name: JSR ABS 15; a product of Japan Synthetic Rubber Co., Ltd.) as the rubber was mixed with 50 parts by weight of the syndiotactic polystyrene prepared in Preparation Example 1. The mixture was dry-blended with 0.5 part by weight of bis(2,6-di-tert-butyl-4-methylphenyl)-pentaerythritol diphosphite as the phosphorus-containing antioxidant and 0.2 part of tetrakis[methylene(3,5-di-tert-butyl-4-hydroxyhydrocinnamate)]methane as the phenolic antioxidant. Then the mixture was kneaded at 300° C. in the air for 2 minutes and extruded. The extrusion moldings thus obtained was subjected to Soxhlet's extraction with 1,2,4-trichlorobenzene as the solvent to obtain the soluble part. The weight average molecular weight of the soluble part was determined at 135° C. by GPC using 1,2,4-trichloro-benzene as the solvent. The results are shown in Table 3.

Example 23

The same procedure as in Example 22 was repeated except that MAS resin (trade name: Methaburene KM-330; a product of Rohm & Haas Co.) was used as the rubber, 0.25 part by weight of bis(2,4-di-t-butylphenyl)-pentaerythritol diphosphite was used as the phosphorus-containing antioxidant and 0.3 part by weight of tetrakis-[methylene(3,5-di-t-butyl-4-hydroxyhydrocinnamate)]methane was used as the phenolic antioxidant. The results are shown in Table 3.

Example 24

The same procedure as in Example 22 was repeated except that 25 parts by weight of polyethylene terephthalate (trade name: Dianite MA-523; a product of Mitsubishi Rayon Co., Ltd. having an intrinsic viscosity ($\eta$) of 0.78 dl/g was used as the thermoplastic resin and 25 parts by weight of the same MAS resin as that used in Example 23 was used as the rubber. The results are shown in Table 3.

Comparative Example 8

The same procedure as in Example 22 was repeated except that 0.4 part by weight of tetrakis[methylene(3,5-di-t-butyl-4-hydroxyhydrocinnamate)]methane was used as the phenolic antioxidant and no phosphorus-containing antioxidant was used. The results are shown in Table 3.

Comparative Example 9

The same procedure as in Example 23 was repeated except that neither phosphorus-containing antioxidant as the antioxidant nor phenolic antioxidant was used but 0.5 part by weight of 4,4'-thiobis(6-t-butyl-3-methylphenol) as the sulfur-having compound was used. The results are shown in Table 3.

at 145.35 ppm. The syndiotacticity (pentad) calculated from the peak area was 96%.

Example 25

Twenty g of the powdery styrene polymer prepared in Preparation Example 2 and having the syndiotactic configuration was stirred together with 140 mg of bis(2,4-di-t-butylphenyl)pentaerythritol diphosphite as the phosphorus-containing antioxidant and 20 mg of 2,6-di-t-butyl-4-methylphenol as the phenolic antioxidant in nitrogen atmosphere to obtain a mixture. The powdery mixture was placed in a metallic cylinder having the porous bottom, heated at 300° C. to melt it and extruded through the pores of the bottom, hereof by means of a piston. The fiber thus prepared was heat-treated at 210° C. for 15 min.

The fiber had a diameter of 0.1 mm, tensile strength of 0.8 GPa, tensile modulus of 5 GPa and melting point of 270° C. The fiber was stable even when it was immersed in an acid, alkali or aqueous solution thereof such as sulfuric acid, 5 wt. % aqueous sulfuric acid solution or 10 wt. % aqueous sodium hydroxide solution, or in an organic solvent such as gasoline, heptane, ethanol or benzaldehyde. The melting point or the mechanical and physical properties thereof were unchanged by the immersion.

TABLE 3

| | resin Component (parts by weight) | | Antioxidant (parts by weight) | | | Weight-average molecular weight |
|---|---|---|---|---|---|---|
| | s-PS *1 | Rubber | Phosphorus-containing antioxidant | Phenolic antioxidant | Sulfur-containing antioxidant | |
| Example 22 | 50 | ABS *2 50 | 0.5 *6 | 0.2 *7 | — | 500,000 |
| Example 23 | 50 | MAS *3 50 | 0.25 *5 | 0.3 *7 | — | 480,000 |
| Example 24 | 50 | PET *4 25 MAS *3 25 | 0.25 *5 | 0.3 *7 | — | 570,000 |
| Comparative Example 8 | 50 | ABS *2 50 | — | 0.4 *7 | — | 230,000 |
| Comparative Example 9 | 50 | MAS *3 50 | — | — | 0.5 *8 | 310,000 |

*1 s-PS: syndiotactic polystyrene
*2 ABS: acrylonitrile/butadiene/styrene copolymer
*3 MAS: methyl methacrylate/n-butyl acrylate/styrene copolymer
*4 PET: polyethylene terephalate
Phosphorus-containing antioxidant:
*5: bis(2,4-di-t-butylphenyl)pentaerythritol diphosphite
*6: bis(2,6-di-t-butyl-4-methylphenyl)pentaerythritol diphosphite
Phenolic antioxidant:
*7: tetrakis[methylene(3,5-di-t-butyl-4-hydroxyhydro-cinnamate)]methane
Sulfur-containing antioxidant:
*8: 4,4'-thiobis(6-t-butyl-3-methylphenol).

Preparation Example 2

Preparation of Styrene Polymer Having Syndiotactic Structure

In a reaction vessel 2 l of toluene as the solvent, and 1 mmol of cyclopentadienyltitanium trichloride and 0.8 mol (in terms of aluminum) of methylaluminoxane as the catalyst components were placed. Then 3.6 l of styrene was added thereto at 20° C. and the polymerization reaction was conducted for 1 hour. After the reaction, the product was washed with a mixture of hydrochloric acid and methanol to decompose and thereby to remove the ash. After drying, 330 g of a polymer was obtained. The polymer was subjected to Soxhlet's extraction with methyl ethyl ketone to obtain 95 wt. % of the extraction residue. The polymer had a weight-average molecular weight of 290,000, number-average molecular weight of 158,000 and a melting point 270° C. In the analysis according to the nuclear magnetic resonance ($^{13}$C-NMR) of isotopic carbon, an absorption owing to the syndiotactic configuration was observed

Example 26

A fiber was prepared from the styrene polymer having the syndiotactic configuration obtained in Preparation Example 2 in the same manner as in Example 25. The fiber was stretched three times at 150° C. to obtain the oriented fiber. The properties of in Table 4.

Example 27

(1) Preparation of styrene polymer having syndiotactic structure:

In a reaction vessel 180 m of toluene as the solvent, and 0.15 mmol of tetraethoxytitanium and 15 mmol (in terms of aluminum) of methylamuminoxane as the catalyst components were placed. A mixture of 145 mmol of styrene and 15 mmol of p-methylstyrene was added thereto at 30° C. and the polymerization reaction was conducted for 2 hours. After the reaction, the product was washed with a mixture of hydrochloric acid and methanol to decompose and thereby to remove the ash. After drying, 22 g of a styrene polymer was obtained.

The polymer was subjected to Soxhlet's extraction with methyl ethyl ketone as the solvent to obtain 99 wt. % of the extraction residue. The polymer had a weight-average molecular weight of 960,000, number-average molecular weight of 460,000 and melting point of 225° C. It had a p-methyl-styrene content of 23 molar %. According to $^{13}$C-NMR analysis, it had absorption at 145.11 ppm, 145.22 ppm and 142.09 ppm like the copolymer described in U.S. Ser. No. 138,914 to reveal that it had a co-syndiotactic configuration.

(2) Preparation of fibrous molding:

The same procedure as in Example 26 was repeated except that the styrene polymer prepared in the above-described step (1) and having the syndiotactic configuration was heated to 250° C. and melt-extruded to obtain the fiber stretched threefold. The properties of the obtained fiber are shown in Table 4.

Example 28

A stretched fiber was prepared in the same manner as in Example 26 except that a mixture of 18 g of the styrene polymer having the syndiotactic configuration prepared in Preparation Example 2, 2 g of an atactic polystyrene (trade name: Idemitsu Styrol US 300; a product of Idemitsu Petrochemical Co., Ltd. having a weight-average molecular weight of 370,000 and MI of 2 g/10 min) , 60 mg of bis(2,4-di-t-butylphenyl)pentaerythritol diphosphite and 60 mg of 2,6-di-t-butyl-4-methylphenol were used. The properties of the fiber are shown in Table 4.

Example 29

A stretched fiber was prepared in the same manner as in Example 26 except that a mixture of 18 g of the styrene polymer having the syndiotactic configuration prepared in Preparation Example 2, 2 g of a polycarbonate (trade name: Idemitsu Polycarbonate A 3000; a product of Idemitsu Petrochemical Co., Ltd. having a viscosity-average molecular weight of 28,500 to 30,500), 100 mg of bis(2,4-di-t-butylphenyl)pentaerythritol diphosphite and 20 mg of 2,6-di-t-butyl-4-methylphenol were used. The properties of the fiber are shown in Table 4.

Example 30

A stretched fiber was prepared in the same manner as in Example 26 except that a mixture of 20 g of the styrene polymer having the syndiotactic configuration prepared in Preparation Example 2 and 0.1 g of talc (trade name: Talc FFR; a product of Asada Seifun Co., Ltd. having an average particle diameter of 0.6 μm) were used. The properties of the fiber are shown in Table 4.

Example 31

(1) Preparation of styrene polymer having syndiotactic configuration:

In a reaction vessel 20 ml of toluene as the solvent, and 0.05 mmol of tetraethoxytitanium and 5 mmol (in terms of aluminum) of methylaluminoxane as the catalyst components were placed. Then 150 ml of styrene was added thereto at 40° C. and the polymerization reaction was conducted for 4 hours. After the reaction, the product was washed with a mixture of hydrochloric acid and methanol to decompose and thereby to remove the ash. After drying, 25 g of polystyrene was obtained. The polymer was subjected to Soxhlet's extraction with methyl ethyl ketone as the solvent to obtain 95 wt. % of the extraction residue. The polymer had a weight-average molecular weight of 1,350,000, number-average molecular weight of 480,000 and melting point of 270° C. In the analysis according to $^{13}$C-NMR, an absorption owing to the syndiotactic configuration was observed at 145.35 ppm. The syndiotacticity (racemic pentad) calculated from the peak area was 96%.

(2) Preparation of fibrous molding:

In a metallic pressure vessel 6 g of the styrene polymer having the syndiotactic configuration prepared in the above-described step (1) , 1.8 mg of 2,6-di-t-butyl-4-methylphenol and 1.8 mg of bis(2,4-di-t-butylphenyl)-pentaerythritol diphosphite were placed, 200 g of p-xylene was added thereto and the mixture was stirred at 125° C. in nitrogen atmosphere to obtain a solution. Then the pressure vessel was furnished with a nozzle and a filament in the form of a gel was extruded through the nozzle by nitrogen pressure. The filament was immersed in acetone for 15 min and then air-dried for 3 min. The wet fiber thus obtained was stretched twice at room temperature to obtain a stretched fiber. The properties of the fiber are shown in Table 4.

Example 32

(1) Preparation of styrene polymer having syndiotactic

In a reaction vessel 80 ml of toluene as the solvent, and 0.178 mmol of tetraethoxytitanium and 17.8 mmol (in terms of aluminum) of methylaluminoxane as the catalyst were placed. Then 440 ml of styrene was added thereto at 20° C. and the polymerization reaction was conducted for 7 hours. After the reaction, the product was washed with a mixture of hydrochloric acid and methanol to decompose and thereby to remove the ash. After drying, 6.8 g of polystyrene was obtained. The polymer was subjected to Soxhlet's extraction with methyl ethyl ketone as the solvent to obtain 98 wt. %. of the extraction residue. The polymer had a weight-average molecular weight of 3,040,000 number-average molecular weight of 1,220,000 and melting point of 270° C. In the analysis according to $^{13}$C-NMR, an absorption owing to the syndiotactic configuration was observed at 145.35 ppm. The syndiotacticity (racemic pentad) calculated from the peak area was 99%.

(2) Preparation of fibrous molding:

The same procedure as in Example 31-(2) was repeated except that the styrene polymer having the syndiotactic configuration prepared in the above-described step (1) was stretched threefold at room temperature. The properties of the obtained fiber are shown in Table 4.

Example 33

The stretched fiber prepared in Example 32 was further stretched fivefold at 150° C. The properties of the obtained fiber are shown in Table 4.

Comparative Example 10

A fiber was prepared in the same manner as in Example 25 except that high-density polyethylene (trade name: Idemitsu Polyethylene 540 E; a product of Idemitsu Petrochemical Co., Ltd. having an MI of 0.14 g/10 min) was molten at 180° C. The properties of the obtained fiber are shown in Table 4.

Comparative Example 11

In a metallic pressure vessel 6 g of high-density polyethylene (trade name: Hi-Zex Million 240M; a product of Mitsui Petrochemical Industries, Ltd. having a weight average molecular weight of 2,000,000) and 0.01 g of 2,6-di-t-butyl-4-methylphenol were placed. 200 g of p-xylene was added thereto and the mixture was stirred at 125° C. in nitrogen atmosphere to obtain a solution. Then the pressure vessel was furnished with a nozzle and a filament in the form of a gel was extruded through the nozzle by nitrogen pressure. The filament was immersed in acetone for 15 min and then air-dried for 3 min. The wet fiber thus obtained was stretched three-fold at room temperature to obtain a stretched fiber. The properties of the fiber are shown in Table 4.

Comparative Example 12

A fiber was prepared in the same manner as in Example 25 except that nylon-6 (trade name: UBE Nylon 1013 B; a product of Ube Industries, Ltd.) molten at 230° C. was used. When the obtained fiber was immersed in water, steam, dilute aqueous alkali solution and dilute aqueous sulfuric acid solution, the tensile strength was reduced from 0.075 GPa to 0.05 GPa by about 30% and the tensile modulus was reduced from 2.4 GPa to 0.75 GPa by about 60%.

Example 34

Twenty parts by weight of the polystyrene prepared in Preparation Example 2 and having the syndiotactic configuration was mixed with 80 parts by weight of a polycarbonate (trade name: Idemitsu Polycarbonate A3000; a product of Idemitsu Petrochemical Co., Ltd. having a viscosity-average molecular weight of 28,500 to 30,500 and a density of 1.20 g/cm$^3$) as the thermoplastic resin. Then 0.7 part by weight of bis(2,4-di-t-butylphenyl)pentaerythritol diphosphite as the phosphorous-containing antioxidant and 0.1 part by weight of 2,6-di-t-butyl-4-methylphenol as the phenolic antioxidant were mixed therein under stirring in nitrogen atmosphere. The mixture was extruded by means of a twin screw extruder having a diameter of 40 mm to obtain pellets.

The pellets were fed in a single screw extruder having a diameter of 40 mm and a T-die at an end thereof to conduct the extrusion at a cylinder temperature of 290° C., T-die temperature of 300° C. and rate of 4.2 kg/h to obtain a sheet having a thickness of 600 μm. The surface temperature of a sheet-cooling roll was 55° C.

TABLE 4

| | Resin composition (parts by weight) | | | | | | | |
|---|---|---|---|---|---|---|---|---|
| | Syndiotactic polystyrene | | Thermoplastic resin or Inorganic filler | | Antioxidant | | Spinning method | Stretching ratio (times) |
| | | | | | Phosphorus-*1 containing | Phenolic*2 | | |
| Example 25 | Mw 280,000 | 100 | — | — | 0.7 | 0.1 | melt spinning | — |
| Example 26 | " | " | — | — | 0.7 | 0.1 | " | 3 |
| Example 27 | Mw 960,000 | " | — | — | 0.7 | 0.1 | " | 3 |
| Example 28 | Mw 280,000 | 90 | a-PS*5 | 10 | 0.3 | 0.3 | " | 3 |
| Example 29 | " | " | PC*6 | 10 | 0.5 | 0.1 | " | 3 |
| Example 30 | " | 100 | Talc | 0.5 | 0.7 | 0.1 | " | 3 |
| Example 31 | Mw 1,350,000 | " | — | — | 0.3 | 0.3 | wet spinning | 2 |
| Example 32 | Mw 3,040,000 | " | — | — | 0.3 | 0.3 | " | 3 |
| Example 33 | " | " | — | — | 0.3 | 0.3 | " | 15 |
| Comparative Example 10 | — | — | PE*7 | 100 | 0.7 | 0.1 | melt spinning | — |
| Comparative Example 11 | — | — | PE*8 | " | — | 0.16 | wet spinning | 3 |
| Comparative Example 12 | — | — | nylon-6 | " | 0.7 | 0.1 | melt spinning | — |

| | Diameter of fibrous molding (mm) | Melting point (°C.) | Influences of acids, alkalis or organic solvents | Mechanical properties of fibrous molding | |
|---|---|---|---|---|---|
| | | | | Tensile strength (GPa)*3 | Modulus of elasticity in tension (GPa)*4 |
| Example 25 | 0.1 | 270 | None | 0.8 | 5 |
| Example 26 | 0.06 | 271 | " | 0.12 | 12 |
| Example 27 | " | 225 | " | 0.13 | 13 |
| Example 28 | " | 250 | " | 0.12 | 11 |
| Example 29 | " | 263 | " | 0.11 | 11 |
| Example 30 | " | 270 | " | 0.14 | 14 |
| Example 31 | 0.07 | 271 | " | 0.09 | 9 |
| Example 32 | 0.06 | 271 | " | 0.15 | 16 |
| Example 33 | 0.026 | 272 | " | 0.22 | 25 |
| Comparative Example 10 | 0.1 | 135 | " | 0.5 | 4 |
| Comparative Example 11 | 0.06 | 137 | " | 0.9 | 12 |
| Comparative Example 12 | 0.1 | 215 | Reduction of mechanical strength | 0.075 (0.05) | 2.4 (0.75) |

Footnote
*1 Phosphorus-containing antioxidant bis(2,4-di-t-butylphenyl)pentaerythritol diphosphite
*2 Phenolic antioxidant 2,6-di-tart-butyl-4-methylphenol
*3 Tensile strength was determined according to ASTM D 3544
*4 Tensile modulus was determined according to ASTM D 3544
*5 Atactic polystyrene
*6 Polycarbonate
*7 High-density polyethylene
*8 High-density polyethylene The thus obtained sheet to be stretched was transparent and had a density of 1.10 g/cm$^3$ and a glass transition temperature of 110° C.

Then, the sheet was uniaxially stretched at 108° C. at a stretching ratio of 4.5 times to obtain a stretched film, which was subjected to heat treatment under tension at 190° C. for 20 sec. The physical properties of the obtained uniaxially stretched film are shown in Table 5.

Example 35

The same procedure as in Example 34 was repeated except that the amount of the polycarbonate was altered to 50 parts by weight and that of the polystyrene prepared in Preparation Example 2 and having the syndiotactic configuration was altered to 50 parts by weight to obtain a sheet to be stretched (hereinafter referred to non-stretched sheet).

Then the sheet was stretched and was subjected to heat treatment in the same manner as in Example 34 to obtain a stretched film. The physical properties of the obtained uniaxially stretched film are shown in Table 5.

Example 36

The same procedure as in Example 34 was repeated except that the amounts of the polycarbonate and the polystyrene prepared in Preparation Example 2 and having the syndiotactic configuration were altered to 20 and 80 parts by weight, respectively. The results are shown in Table 5.

Example 37

The same procedure as in Example 34 was repeated except that 80 parts by weight of the polycarbonate was replaced with 50 parts by weight of polyethylene terephthalate (trade name Dianite MA 523; a product of Mitsubishi Rayon Co., Ltd. having an intrinsic viscosity [$\eta$] of 0.78 dl/g, melting point of 255° C. and density of 1.34 g/cm$^3$), that the amount of the polystyrene having the syndiotactic configuration prepared in Preparation Example 2 was altered to 50 parts by weight and that 10 parts by weight of polystyrene-grafted polybutylene terephthalate (trade name: HS-6; a production of Toa Gosei Chemical Industry Co., Ltd.) was used as the compatibilizing agent. The results are shown in Table 5.

Example 38

The same procedure as in Example 34 was repeated except that 80 parts by weight of the polycarbonate was replaced with 50 parts by weight of an atactic polystyrene (trade name: Idemitsu Styrol US 300; a product of Idemitsu Petrochemical Co., Ltd. having a weight-average molecular weight of 370,000, melt index of 2 g/10min and density of 1.05 g/cm$^3$) and that the amount of the polystyrene prepared in Preparation Example 2 and having the syndiotactic configuration was altered to 50 parts by weight. The results are shown in Table 5.

Example 39

The same procedure as in Example 34 was repeated except that 80 parts by weight of the polycarbonate was replaced with 50 parts by weight of polyphenylene oxide having a weight-average molecular weight of 7.200 (a product of SCIENTIFIC POLYMER PRODUCTS INC., Catalog No. V-100) and that the amount of the polystyrene prepared in Preparation Example 2 and having the syndiotactic configuration was altered to 50 parts by weight The results are shown in Table 5.

Example 40

The same procedure as in Example 34 was repeated except that 80 parts by weight of the polycarbonate was replaced with 50 parts by weight of ABS resin (trade name: JSR ABS 15; a product of Japan Synthetic Rubber Co., Ltd.) and that the amount of the polystyrene prepared in Preparation Example 2 and having the syndiotactic configuration was altered to 50 parts by weight The results are shown in Table 5.

Example 41

The same procedure as in Example 34 was repeated except that 80 parts by weight of the polycarbonate was replaced With 50 parts by weight of methyl methacrylate/n-butyl acrylate/styrene copolymer (trade name: methaburene KM 330; a product of Rohm & Hass Co.) and that the amount of the polystyrene prepared in Preparation Example 2 and having the syndiotactic configuration was altered to 50 parts by weight. The results are shown in Table 5.

Example 42

The same procedure as in Example 34 was repeated except that the polycarbonate was not used and that 0.4 part by weight of talc (trade name: Talc FFR; a product of Asada Seifun Co., Ltd. having an average particle diameter of 0.6 $\mu$m) was used as an inorganic filler for 100 parts by weight of the polystyrene prepared in Preparation Example 2 and having the syndiotactic configuration. The results are shown in Table 5.

Example 43

The sheet prepared in Example 42 to be stretched was stretched both simultaneously at a draw ratio of 4×4 to obtain a biaxially stretched film. This film had an elongation at break of 55%.

The biaxially stretched film was subjected to heat treatment under tension at 210° C. for 20 sec. The physical properties of the obtained biaxially stretched film are shown in Table 5.

Example 44

The same procedure as in Example 38 was repeated except that 0.4 part by weight of the same talc as in Example 42 was added. The results are shown in Table 5.

Example 45

The same procedure as in Example 34 was repeated except that 50 parts by weight of the polystyrene prepared in Preparation Example 2 and having the syndiotactic configuration, 25 parts by weight of the same atactic polystyrene as in Example 38 and 25 parts by weight of the same methyl methacrylate/n-butyl acrylate/styrene copolymer as in Example 41 were used. The results are shown in Table 5.

Comparative Example 13

The non-stretched sheet prepared in Example 35 was subjected to heat treatment (heat fixation) under tension at 190° C. for 20 sec, omitting the stretching operation. The physical properties of the obtained sheet are shown in Table 5.

Comparative Example 14

The non-stretched sheet prepared in Example 37 was subjected to heat treatment under tension at 190° C. for 20 sec, omitting the stretching operation. The physical properties of the obtained sheet are shown in Table 5.

Comparative Example 15

The non-stretched sheet prepared in Example 38 was subjected to heat treatment under tension at 170° C. for 20 sec, omitting the stretching operation. The physical properties of the obtained sheet are shown in Table 5.

Comparative Example 16

The non-stretched sheet prepared in Example 39 was subjected to heat treatment under tension at 180° C. for 20 sec, omitting the stretching operation. The physical properties of the obtained sheet are shown in Table 5.

Comparative Example 17

The non-stretched sheet prepared in Example 40 was subjected to heat treatment under tension at 160° C. for 20 sec, omitting the stretching operation. The physical properties of the obtained sheet are shown in Table 5.

Comparative Example 18

The non-stretched sheet prepared in Example 41 was subjected to heat treatment under tension at 200° C. for 20 sec, omitting the stretching operation. The physical properties of the obtained sheet are shown in Table 5.

Comparative Example 19

The non-stretched sheet prepared in Example 42 was subjected to heat treatment under tension at 200° C. for 20 sec, omitting the stretching operation. The physical properties of the obtained sheet are shown in Table 5.

Comparative Example 20

The same procedure as in Example 35 was repeated except that the polystyrene prepared in Preparation Example 2 and having the syndiotactic configuration was replaced with the same atactic polystyrene as in Example 38. The results are shown in Table 5.

Comparative Example 21

A sheet of the same atactic polystyrene as in Example 38 was stretched in the same manner as in Example 34. The heat treatment was not conducted. The physical properties of the oriented film thus obtained are shown in Table 5.

Comparative Example 22

The same procedure as in Example 42 was repeated except that the amount of the talc was altered to 25 parts by weight. The sheet could not be stretched but was broken.

Comparative Example 23

The non-stretched sheet prepared in Example 45 was subjected to heat treatment under tension at 190° C. for 20 sec. The physical properties of the film thus obtained are shown in Table 5.

TABLE 5

| | Component (A) | | Component (B) *2 | Component (C) | | Stretching ratio (times) (Parts by weight) | |
|---|---|---|---|---|---|---|---|
| | | | | | | longitudinal | width |
| Example 34 | SPC/PC | 20/80 | | — | — | 4.5 | — |
| Example 35 | SPC/PC | 50/50 | | — | — | 4.5 | — |
| Example 36 | SPC/PC | 80/20 | | — | — | 4.5 | — |
| Example 37 | SPS/PET | 50/50 | | — | — | 4.5 | — |
| Example 38 | SPS/aPS | 50/50 | | — | — | 4.5 | — |
| Example 39 | SPS/PPO | 50/50 | | — | — | 4.5 | — |
| Example 40 | SPS/ABS | 50/50 | | — | — | 4.5 | — |
| Example 41 | SPS/MAS | 50/50 | | — | — | 4.5 | — |
| Example 42 | SPS | 100 | | Talc | 0.4 | 4.5 | — |
| Example 43 | SPS | 100 | A: 0.7 | Talc | 0.4 | 4 | 4 |
| Example 44 | SPS/aPS | 50/50 | B: 0.1 | Talc | 0.4 | 4 | — |
| Example 45 | SPS/aPS/MAS | 50/25/25 | | — | — | 4.5 | — |
| Comparative Example 13 | SPC/PC | 50/50 | | — | — | — | — |
| Comparative Example 14 | SPS/PET | 50/50 | | — | — | — | — |
| Comparative Example 15 | SPS/aPS | 50/50 | | — | — | — | — |
| Comparative Example 16 | SPS/PPO | 50/50 | | — | — | — | — |
| Comparative Example 17 | SPS/ABS | 50/50 | | — | — | — | — |
| Comparative Example 18 | SPS/MAS | 50/50 | | — | — | — | — |
| Comparative Example 19 | SPS | 100 | | Talc | 0.4 | — | — |
| Comparative Example 20 | aPS/PC | 50/50 | | — | — | 4.5 | — |
| Comparative Example 21 | aPS | 100 | | — | — | 4.5 | — |
| Comparative Example 22 | SPS | 100 | | Talc | 25 | 4.5 | — |
| Comparative Example 23 | SPS/aPS/MAS | 50/25/25 | | — | — | — | — |

| | Tensile modulus (kg/cm$^2$) | | Tensile strength (kg.cm$^2$) | | Thermal deformation temperature (°C.) |
|---|---|---|---|---|---|
| | longitudinal | width | longitudinal | width | |
| Example 34 | 72,200 | 27,000 | 1420 | 600 | 170 |
| Example 35 | 76,700 | 36,100 | 1440 | 610 | 190 |
| Example 36 | 99,300 | 32,400 | 1300 | 540 | 205 |
| Example 37 | 99,000 | 32,700 | 1240 | 510 | 200 |
| Example 38 | 105,000 | 38,200 | 1430 | 650 | 175 |
| Example 39 | 112,000 | 40,100 | 1550 | 710 | 183 |
| Example 40 | 62,500 | 26,500 | 1300 | 600 | 161 |
| Example 41 | 108,000 | 39,500 | 1320 | 540 | 241 |
| Example 42 | 189,000 | 70,600 | 1270 | 530 | 253 |
| Example 43 | 72,000 | 70,300 | 1180 | 1160 | 257 |
| Example 44 | 115,000 | 38,000 | 1380 | 650 | 186 |
| Example 45 | 107,000 | 38,900 | 1380 | 600 | 203 |

TABLE 5-continued

| | | | | | |
|---|---|---|---|---|---|
| Comparative Example 13 | | 27,600 | | 650 | 170 |
| Comparative Example 14 | | 29,200 | | 580 | 190 |
| Comparative Example 15 | | 31,900 | | 650 | 160 |
| Comparative Example 16 | | 34,000 | | 700 | 170 |
| Comparative Example 17 | | 24,000 | | 560 | 150 |
| Comparative Example 18 | | 34,000 | | 560 | 220 |
| Comparative Example 19 | | 57,200 | | 540 | 230 |
| Comparative Example 20 | 73,500 | 27,200 | 1090 | 540 | 120 |
| Comparative Example 21 | 67,000 | 27,500 | 1100 | 600 | 80 |
| Comparative Example 22 | The sheet could not be stretched but was broken | | | | |
| Comparative Example 23 | | 32,000 | | 590 | 185 |

Footnote
*1 SPS: Syndiotactic polystyrene
PC: Polycarbonate
PET: Polyethylene terephthalate
aPS: Atactic polystyrene
PPO: Polyphenyleneoxide
ABS: ABS resin (acrylonitrile/butadiene/styrene copolymer)
MAS: Methylacrylate/n-butyl acrylate/styrene copolymer
*2 Antioxidant
A: bis(2,4-di-t-butylphenyl)pentaerythritol diphosphite
B: 2,6-di-t-butyl-4-methylphenol
*3 Determined by Thermal Mechanical Analysis The third invention is described in greater detail with reference to the following examples.

Comparative Example 1A (1) (Preparation of Methylauminoxane)

200 ml of toluene was placed in a reactor and 47.4 ml (492 millimoles) of trimethylaluminum and 35.5 g (142 millimoles) of copper sulfate pentahydrate were added thereto and reacted with each other at 20° C. for 24 hours.

Then the solid portion was removed form the reaction mixture to obtain a toluene solution containing 12.4 g of methylaluminoxane.

(2) (Production of Polystyrene having Syndiotactic Configuration)

2 L (L=liter) of toluene as a solvent, and 5 mmol of tetraethoxytitanium and 500 mmol (as aluminum atom) of methylaluminoxane obtained in abovedescribed (1) as catalyst components were placed in a reactor, and then 15 L of styrene was added at 50° C. and polymerized for 4 hours.

After polymerization, the reaction product was washed with a mixture of hydrochloric acid and methanol to decompose and remove the catalyst components, and then dried to obtain 2.5 kg of a styrene-based resin (polystyrene). The polymer was subjected to Soxhlet extraction using methyl ethyl ketone as a solvent to obtain 95% by weight of an extraction residue. The weight average molecular weight of the residue was 800,000. A $^{13}$C-NMR analysis (solvent: 1,2-dichlorobenzene) showed a peak at 145.35 ppm, ascribable to the syndiotactic structure, and the syndiotacticity in terms of the racemi pentad as calculated from the peak area was 96%. The melt viscosity of the styrene polymer as determined with a capillary rheometer using Autograph 1125 (manufactured by Instrom Copy ) was $7 \times 10^4$ poises under conditions of temperature 300° C. and rate of shear 10/sec (3) (Production of Polystyrene having Syndiotactic Configuration)

2 L of toluene as a solvent, and 5 mmol of tetraethoxytitanium and 300 mmol (as aluminum atom) of methylaluminoxane obtained in abovedescribed (1) as catalyst components were placed in a reactor, and then 15 L of styrene was added at 55° C. and polymerized for 4 hours.

After polymerization, the reaction product was washed with a mixture of hydrochloric acid and methanol to decompose and remove the catalyst components and then dried to obtain 2.5 kg of a styrene-based resin (polystyrene) The polymer was subjected to Soxhlet extraction using methyl ethyl ketone as a solvent to obtain 97% by weight of the extraction residue. The weight average molecular weight of the residue was 400,000. A $^{13}$C-NMR analysis showed a peak at 145.35 ppm, ascribable to the syndiotactic structure, and the syndiotacticity in terms of the racemi pentad as calculated from the peak area was 98%.

The melt viscosity of the styrene polymer as determined under the same conditions as above (2) was $2 \times 10^4$ poises.

(4)(Production of Polystyrene having Syndiotactic Configuration)

2 L of toluene as a solvent, and 1 mmol of cyclopentadienyltitanium trichloride and 500 mmol (as aluminum atom) of methylaluminoxane obtained in abovedescribed (1) as catalyst components were placed in a reactor, and then 3.6 L of styrene was added at 20° C. and polymerized for 1 hour.

After polymerization, the reaction product was washed with a mixture of hydrochloric acid and methanol to decompose and remove the catalyst components, and then dried to obtain 330 g of a styrene-based resin (polystyrene). The polymer was subjected to Soxhlet extraction using methyl ethyl ketone as a solvent to obtain 95% by weight of an extraction residue. The weight average molecular weight of the residue was 290,000, the number average molecular weight thereof was 158,000 and the melting point was 270° C. A $^{13}$C-NMR analysis showed a peak at syndiotacticity in terms of the racemi pentad as calculated from the peak area was 96%. The melt viscosity of the styrene polymer as determined under the same conditions as above (2) was $4 \times 10^3$ poises.

(5)(production of Polystyrene having Syndiotactic Configuration)

50 ml of toluene as a solvent, and 0.075 mmol of tetraethoxytitanium and 7.5 mmol (as aluminum atom) of methylaluminoxane obtained in abovedescribed (1) a catalyst components were placed in a reactor, and then 225 ml of styrene was added at 40° C. and subsequently hydrogen was introduced therein until the hydrogen pressure reached 5 kg/cm$^2$. Polymerization was performed for 1.5 hours.

After polymerization, the reaction product was washed with a mixture of hydrochloric acid and methanol to decompose and remove the catalyst components, and then dried to obtain 15.0 g of a styrene-based resin(polystyrene). The polymer was subjected to Soxhlet extraction using methyl ethyl ketone as a solvent to obtain 95% by weight of an extraction residue. The weight average molecular weight of the residue was 16,000 and the number average molecular weight thereof was 3,000. A $^{13}$C-NMR analysis showed a peak at 145.35 ppm, ascribable to the syndiotactic structure, and the syndiotacticity in terms of the racemi pentad as calculated from the peak area was 98%.

Example 1A

To the polystyrene obtained in Reference Example 1A(2) were added 0.7 part by weight of bis(2,4-di-tert-butylphenyl) pentaerythritol diphosphite and 0.1 part by weight of tetraquis(methylene(3,5-di-tert-butyl-4-hydroxyhydrocinnamate))methane as antioxidants, and the resulting mixture was extruded and pelletized by the use of a twin-screw extruder having a diameter of 40 mm.

The pellets thus obtained were introduced in a single-screw extruder having a diameter of 40 mm and equipped with a T die at the top thereof, and extruded under conditions of cylinder temperature 290° C., T die temperature 300° C., through put 4.2 kg/hr. while quenching to 30° C. at average quenching rate of 50° C./sec. to produce a sheet having a thickness of 600 μm.

The sheet for stretching as obtained above was transparent and had a density of 1.04 g/cm$^3$, a glass transition temperature of 90° C. and a crystallinity of 2%. The sheet was subjected to simultaneous biaxial stretching (draw ratio: 2×2) at 125° C. to obtain a stretched film. This stretched film was subjected to annealing in a state of tension at 160° C. for 20 seconds. The physical properties of the film are shown in Table 1A.

The sheet was uniaxially stretched in MD at a draw ratio of 4.5 at a stretching temperature of 120° C. to obtain a shown in Table 1A.

Example 2A

The film obtained in Example 1 was subjected to heat treatment in a state of tension at 210° C. for 20 seconds. The physical properties of the film thus treated are shown in Table 1A.

Example 3A

The sheet for stretching as obtained in Example 1 was subjected to simultaneous biaxial stretching (draw ratio: 2×2) at 125° C. to obtain a stretched film. The physical properties of the film are shown in Table 1A.

Example 4A

The film as obtained in Example 3 was subjected to annealing in a state of tension at 160° C. for 20 seconds. The physical properties of the film are shown in Table 1A.

Example 5A

The sheet for stretching as obtained in Example 1 was subjected to simultaneous biaxial stretching (draw ratio: 4×4) at 120° C. to obtain a stretched film. The physical properties of the film are shown in Table 1A.

Example 6A

The sheet for stretching as obtained in Example 1 was first stretched to a draw ratio of 3.5 times in MD and then to a draw ratio of 3 times in TD to obtain a stretched film. The physical properties of the film are shown in Table 1A.

Example 7A

A styrene-based polymer (polystyrene), having a weight average molecular weight of 1,500,000 and a syndiotacticity in a racemi pentad of 96%, was produced in the same manner as in Reference Example 1A except that the polymerization temperature was changed from 50° C. to 35° C. 2 parts by weight of talc powder as a lubricant was added to the polystyrene, and the resulting mixture was molded into a sheet at 280° C. by the use of a calender roll. The surface temperature of the roll for cooling the sheet was 10° C.

The sheet was then subjected to simultaneous biaxial stretching (draw ratio: 2.5×2.5) at 120° C. to obtain a stretched film. The physical properties of the film are shown in Table 1A.

Example 8A

To a mixture of 90 parts by weight of the polystyrene obtained in Reference Example 1 and 10 parts by weight of atactic polystyrene (trade name: NF20; weight average molecular weight: 300,000; produced by Idemitsu Petrochemical Co., Ltd.) were added 0.1 part by weight of bis(2,4-di-tert-butylphenyl)pentaerythritol disphosphite and 0.1 part by weight of tetraquis(methylene(3,5-di-tert-butyl-4-hydroxyhydrocinnamate)) methane, and the resulting mixture was extruded and pelletized by the use of a twin-screw extruder having a diameter of 40 mm.

The pellets thus obtained were introduced into a single screw extruder having a diameter of 40 mm and equipped with a T die at the top thereof, and extruded under conditions of cylinder temperature 290° C., T die temperature 300° C. and through put 4.2 kg/hr. while quenching to 20° C. at average quenching rate of 50° C./sec. to obtain a sheet having a thickness of 600 μm.

The sheet thus obtained had a density of 1.04 g/cm$^3$, a glass transition temperature of 100° C. and a crystallinity of 2%.

The sheet was subjected to simultaneous biaxial stretching (draw ratio: 3.5×3.5) at 125° C. to obtain a stretched film. The physical properties of the film are shown in Table 1A.

Example 9A

The pellets obtained in Example 1A were molded by the use of an injection molding machine to produce a preliminary molding (outer diameter: 28 mm; total length: 150 mm; thickness: 2.0 mm; weight: 35 g). This preliminary molding (crystallinity: 5%) was subjected to biaxial stretching blow molding by heating it at 130° C. for 50 seconds with an infrared ray heater and blowing nitrogen gas at a pressure of 25 kg/cm$^2$ in a stretching blow molding machine to obtain a hollow container having a volume of 1 L. The physical properties of the container are shown in Table 1A.

Example 10A

An original film was produced in the same manner as in Example 4A, using the styrene polymer obtained in Reference Example 1A (3). The average quenching rate was 40° C./sec. and the cooling temperature was 30° C. The original film thus obtained (thickness: 0.4 mm: crystallinity: 4%) was subjected to simultaneous biaxial stretching in both MD and TD each to 4 times the original length (draw ratio: 4×4), and then annealed at 260° C. for 15 seconds. The results are shown in Table 1A.

Example 11A

An original film was produced in the same manner as in Example 4A, using the styrene polymer obtained in Reference Example 1A(4). The quenching rate was 30° C./sec. and the cooling temperature was 30° C. The original film thus obtained (thickness: 0.5 mm; crystallinity: 4%) was subjected to simultaneous biaxial stretching in both MD and TD each to 4.5 times the original length (draw ratio: 4.5×4.5), and then annealed at 250° C. for 10 seconds. The results are shown in Table 1A.

Comparative Example 1A

The physical properties of the sheet (not-stretched sheet) as obtained in Example 1A are shown in Table 1A.

Comparative Example 2A

An original sheet for stretching as obtained in Example 1 was subjected to annealing in a state of tension at 150° C. for 600 seconds. The physical properties of the sheet are shown in Table 1A.

Comparative Example 3A

To the styrene polymer obtained in Reference Example 1 (5) was added the same antioxidant as used in Example 1A, and the resulting mixture was press molded to obtain an amorphous original film. On heating the amorphous original film to 120° C., the film was deformed by the weight thereof and could not be stretched.

EXAMPLE 12A

The sheet of 0.1 mm thickness obtained in the same manner as in Example 1A was subjected to simultaneous biaxial stretching (draw ratio: 2.0×2.0) at 125° C. to obtain a stretched film having a thickness of 50 μm. This film was further subjected to annealing at 210° C.

The physical properties of the sheet are shown in Table 2. The sheet was measured for changes with temperature of dielectric constant and dielectric loss tangent by the us of an apparatus for measuring a dielectric constant (produced by Toyo Seiki Co., Ltd.) at a frequency of 976 Hz. The results are shown in FIG. 1A.

It can be seen from FIG. 1 that the temperature dependency of dielectric constant and dielectric loss is small.

Examples 13A to 16A

Stretched films of 25 μm thickness were produced in the same manner as in Example 12 except that the thickness of original sheet, the stretching temperature, draw ratio, annealing temperature and annealing time were changed as shown in Table 2A.

The physical properties of the films are shown in Table 2A.

Comparative Example 4A

A stretched film was produced in the same manner as in Example 10A except that atactic polystyrene (NF 20) was used in place of the polystyrene obtained in Reference Example 1A and the stretching temperature and the draw ratio were changed to 120° C. and 3.0×3.0, respectively.

The stretched film melted upon application of heat treatment at 170° C.

Comparative Example 5A

The pellets obtained in Example 1 were heat pressed and then quenched to obtain a sheet (crystallinity: 6%) having a thickness of 3 mm. This sheet was subjected to annealing at 170° C. for 600 seconds. The results are shown in Table 2A.

Reference Example 2A

Production of Styrene Copolymer having Mainly Syndiotactic Configuration

6 L of toluene as a solvent, and 5 mmol of tetraethoxytitanium and 500 mmol (as aluminum atom) of methylaluminoxane as catalyst components were placed in a reactor, and then 48.75 mol of styrene and 1.25 mol of p-methylstyrene were added thereto at 50° C. and polymerized for 2 hours.

After of polymerization, the reaction product was washed with a mixture of hydrochloric acid and methanol to decompose and remove the catalyst components, and then dried to obtain 640 g of a copolymer. This copolymer was subjected to Soxhlet extraction using methyl ethyl ketone as a solvent to obtain 80% by weight of an extraction residue. The copolymer, the residue, had a weight average molecular weight of 440,000, a number average molecular weight of 240,000 and melting point of 255° C. The p-methylstyrene unit content of the copolymer was 5 mol%.

A $^{13}$C-NMR analysis of the copolymer showed peaks at 145.11 ppm, 145.22 ppm and 142.09 ppm.

Example 17A

A stretched film was produced in the same manner as in Example 12 except that the styrene copolymer obtained in Reference Example 2A was used and the draw ratio was changed to 3.5×3.5.

The physical properties of the film are shown in Table 2A.

Example 18A

To a mixture of 95 parts by weight of the polystyrene obtained in Reference Example 1 and 5 parts by weight of glass fiber having an average fiber length of 3 mm (produced by Asahi Fiber Glass Co., Ltd.; fiber diameter: 10–15 μm: in the chopped strand form) were added 0.1 part by weight of bis(2,4-di-tert-butylphenyl)pentaerythritol diphosphite and 0.1 part by weight of tetraquis(methylene(3,5-di-tert-butyl-4-hydroxyhydrocinnamate))methane as antioxidants, and the resulting mixture was extruded and pelletized by the use of a twin-screw extruder having diameter of 40 mm.

The pellets thus obtained were introduced into a single screw extruder having a diameter of 40 mm and equipped with a T die at the top thereof, and extruded under conditions of cylinder temperature 290° C., T die temperature 300° C. and through put 4.2 kg/hr. while quenching to 30° C. at average quenching rate of 75° C./sec. to obtain a sheet having a thickness of 200 μm.

The sheet was subjected to simultaneous biaxial stretching (draw ratio: 2×2) at 125° C. to obtain a stretched film. The physical properties of the film are shown in Table 2A.

TABLE 1A

| No. | Resin *1 | Weight *2 Average Molecular Weight | Cooling Rate °C./sec. | Cooling Temp. °C. | Stretching Temp. °C. | Mode of Stretching | Draw Ratio MD | Draw Ratio TD | Original Sheet or Film Thickness mm | Original Sheet or Film Crystal- *3 linity % |
|---|---|---|---|---|---|---|---|---|---|---|
| Example 1A | SPS | 800,000 | 50 | 30 | 120 | Uniaxial | 4.5 | 1.0 | 0.6 | 2 |
| Example 2A | SPS | 800,000 | 50 | 30 | 120 | Uniaxial | 4.5 | 1.0 | 0.6 | 2 |
| Example 3A | SPS | 800,000 | 50 | 30 | 125 | Simultaneous Biaxial | 2.0 | 2.0 | 0.6 | 2 |
| Example 4A | SPS | 800,000 | 50 | 30 | 125 | Simultaneous Biaxial | 2.0 | 2.0 | 0.6 | 2 |
| Example 5A | SPS | 800,000 | 50 | 30 | 120 | Simultaneous Biaxial | 4.0 | 4.0 | 0.6 | 2 |
| Example 6A | SPS | 800,000 | 50 | 30 | 125 | Sequential Biaxial | 3.5 | 3.0 | 0.6 | 2 |
| Example 7A | SPS | 1,500,000 | 75 | 10 | 120 | Simultaneous Biaxial | 2.5 | 2.5 | 0.6 | 2 |
| Example 8A | SPS | 800,000 | 20 | 30 | 125 | Simultaneous Biaxial | 3.5 | 3.5 | 0.6 | 2 |
| Example 9A | SPS | 800,000 | 100 | 5 | 130 | Simultaneous Biaxial | 3.3 | 3.3 | 2.0 | 5 |
| Example 10A | SPS | 400,000 | 40 | 30 | 115 | Simultaneous Biaxial | 4.0 | 4.0 | 0.4 | 4 |
| Example 11A | SPS | 250,000 | 30 | 30 | 115 | Simultaneous Biaxial | 4.5 | 4.5 | 0.5 | 4 |
| Comparative Example 1A | SPS | 800,000 | 50 | 30 | — | — | 1.0 | 1.0 | 0.6 | 2 |
| Comparative Example 2A | SPS | 800,000 | 50 | 30 | — | — | 1.0 | 1.0 | 0.6 | 2 |
| Comparative Example 3A | SPS | 16,000 | 100 | 10 | 120 | Simultaneous Biaxial | Unable to Stretch | | 0.6 | 2 |

| No. | Annealing Temp. °C. | Annealing Time sec. | Stretched Molding Thickness μm | Stretched Molding Crystal- *3 linity % | Tensile Strength (kg/cm²) MD | Tensile Strength (kg/cm²) TD | Tensile Modulus (kg/cm²) MD | Tensile Modulus (kg/cm²) TD | Haze % | Temp. of 2% *4 Deformation °C. |
|---|---|---|---|---|---|---|---|---|---|---|
| Example 1A | — | — | 130 | 51 | 12 | 5 | 101 | 30 | 2 | 110 |
| Example 2A | 210 | 20 | 130 | 55 | 13 | 5.5 | 110 | 41 | 3 | 209 |
| Example 3A | — | — | 150 | 28 | 10.5 | 10 | 39 | 38 | 2 | 115 |
| Example 4A | 160 | 20 | 150 | 50 | 10.6 | 10.2 | 39 | 39 | 5 | 158 |
| Example 5A | — | — | 40 | 46 | 12 | 11.8 | 42 | 41 | 2 | 120 |
| Example 6A | — | — | 55 | 44 | 11 | 10.4 | 39 | 38 | 2 | 121 |
| Example 7A | 213 | 20 | 100 | 51 | 14 | 13 | 43 | 42 | 25 | 210 |
| Example 8A | — | — | 50 | 45 | 11.5 | 10 | 39 | 38 | 2 | 121 |
| Example 9A | — | — | 200 | 49 | 11.2 | 11 | 39 | 39 | 5 | 120 |
| Example 10A | 260 | 15 | 25 | 55 | 12 | 12 | 50 | 45 | 1.5 | 259 |
| Example 11A | 250 | 10 | 25 | 54 | 12 | 12 | 52 | 47 | 1.5 | 254 |
| Comparative Example 1A | — | — | — | — | 6.6 | 4.5 | 28 | 29 | 2 | 90 |
| Comparative Example 2A | 150 | 600 | — | 41 | 5.8 | 4.3 | 30 | 30 | 45 | 143 |
| Comparative Example 3A | — | — | — | — | — | — | — | — | — | — |

*1 SPS: syndiotactic polystyrene, COMe: syndiotactic poly(styrene-p-methyl styrene)
*2 measured by Gel Permeation Chromatography (GPC) using 1,2,4-trichlorobenzene as solvent
*3 measured by Differential Scanning Calorimeter (DSC)
*4 Temperature of 2% diformation measured by Thermal Mechanical Analysis (TMA)

TABLE 2A

| No. | Resin *1 | Weight Average *2 Molecular Weight | Cooling Rate °C./sec. | Cooling Temp. °C. | Stretching Temp. °C. | Mode of Stretching | Draw Ratio MD | Draw Ratio TD |
|---|---|---|---|---|---|---|---|---|
| Example 12A | SPS | 800,000 | 50 | 30 | 125 | Simultaneous Biaxial | 2.0 | 2.0 |
| Example 13A | SPS | 800,000 | 50 | 30 | 125 | Simultaneous Biaxial | 4.0 | 4.0 |
| Example 14A | SPS | 800,000 | 50 | 30 | 125 | Simultaneous Biaxial | 4.0 | 4.0 |
| Example 15A | SPS | 800,000 | 50 | 30 | 125 | Sequential Biaxial | 3.5 | 3.0 |
| Example 16A | SPS | 800,000 | 50 | 30 | 170 | Sequential Biaxial | 3.0 | 3.0 |
| Example 17A | COMe | 440,000 | 25 | 30 | 125 | Simultaneous Biaxial | 3.5 | 3.5 |
| Example 18A | SPS | 800,000 | 75 | 10 | 125 | Simultaneous Biaxial | 2.0 | 2.0 |
| Comparative Example 4A | SPS | 800,000 | 100 | 10 | — | — | 1.0 | 1.0 |

TABLE 2A-continued

| No. | Original Sheet or Film Thickness mm | Original Sheet or Film Crystallinity *3 % | Annealing Temp. °C. | Annealing Time sec. | Stretched Molding Thickness μm | Stretched Molding Crystallinity *3 % | Temp. of 2% *4 Deformation °C. | BDV *5 kV/mm |
|---|---|---|---|---|---|---|---|---|
| Example 12A | 0.1 | 2 | 210 | 30 | 25 | 51 | 215 | 200 |
| Example 13A | 0.4 | 3 | 240 | 30 | 25 | 53 | 240 | 270 |
| Example 14A | 0.4 | 3 | 190 | 600 | 25 | 52 | 200 | 270 |
| Example 15A | 0.25 | 3 | 240 | 20 | 25 | 50 | 242 | 270 |
| Example 16A | 0.2 | 2 | 240 | 30 | 25 | 49 | 241 | 280 |
| Example 17A | 0.25 | 3 | 170 | 100 | 25 | 48 | 219 | 260 |
| Example 18A | 0.1 | 2 | 220 | 30 | 25 | 53 | 240 | 205 |
| Comparative Example 4A | 3 | 6 | 170 | 600 | — | 49 | 151 | 22 |

*1 to *4 same as in Table 1A
*5 Breakdown Voltage (BVD) measured according to JIS C-2110 at 25° C.

The following illustrates the particularly preferred stretched embodiment requiring high molecular weight of preferably above 300,000 and high syndiotacticity of above 85% in the pentad.

As described above, wet drawing or gel drawing is performed, using solvents including benzene, toluene, xylene, ethyl benzene, cyclohexane, Decalin, N-methyl pyrrolidone, tetrahydrofuran, carbon tetrachloride, chloroform, dichloro methane, monochloro benzene, dichloro benzene, trichloro benzene, Trichlene and the like. Further, the drawing treatment may optionally be performed of a styrene-based polymer having a syndiotactic structure admixed with a styrene-based polymer having an atactic structure, a styrene-based polymer having an isotactic structure or a styrene-based polymer of a low molecular weight having a syndiotactic structure and further with a suitable amount of an antistatic agent, lubricant, anti-fogging agent, heat stabilizer, dye, pigment, metal powder and inorganic fine powder such as talc, mica and the like.

Example 1B (1) Preparation of a styrene-based polymer

Into a reaction vessel were introduced 20 ml of toluene as a solvent, 0.05 m mole of tetraethoxy titanium and 5 m moles as aluminum atoms of methyl aluminoxane as the catalytic ingredients and then 150 ml of styrene were added thereto at 40° C. to conduct the polymerization reaction for hours. After completion of the reaction, the product was washed with a liquid mixture of methyl alcohol and hydrochloric acid to decompose and remove the catalytic ingredients. Subsequent drying gave 25 g of a styrene-based polymer, i.e. polystyrene. This polymer was then subjected to extraction in a Soxhlet extractor using methyl ethyl ketone as the solvent to obtain 95% by weight of the unextracted matter, which is referred to as MIP hereinbelow. This material had a weight-average molecular weight of 1,350,000, number-average molecular weight of 480,000 and melting point of 270° C. The $^{13}$C-NMR analysis indicated an absorption at 145.35 ppm assignable to the syndiotactic structure and the syndiotacticity in the racemic pentad was 96% as calculated from the area of the absorption peak.

(2) Preparation of a shaped article

The styrene-based polymer having a syndiotactic structure obtained in (1) described above was extruded out of an extrusion molding machine and shaped into a strand. This strand was subjected to a drawing treatment in a drawing ratio of 300% in an oil bath kept at 130° C. followed by cooling to room temperature without releasing the tension The thus obtained strand after drawing had a tensile modulus of 150,000 kg/cm².

Example 2B

In the same manner as in (1) of Example 1B, a polystyrene having a weight-average molecular weight of 800,000 and a syndiotacticity of 96% was compounded with each 0.1% by weight of bis(2,4-di-tert-butyl phenyl) pentaerithritol diphosphite and tetrakis[methylene(3,5-di-tert-butyl-4-hydroxy cinnamate)] methane as the antioxidants and pelletized by extrusion out of a double-screw extruder of 40 mm diameter.

The pellets were fed to a single-screw extruder of 40 mm diameter equipped with a T-die at the front end and extruded to give a sheet of 600 μm thickness under the conditions of the temperature of the cylinder at 290° C, temperature of the T-die at 300° C. and rate of extrusion of 4.2 kg/hour. The cooling roller of the sheet was kept at 55° C.

The thus obtained transparent sheet had a density of 1.08 g/cm³ and a glass transition temperature of 101° C. The sheet was subjected to a uniaxial drawing treatment at 108° C. to give a film as drawn in a drawing ratio of 450%. This film was subjected to a thermal fixing treatment at 190° C. and 210° C. each for 20 seconds under tension.

The physical properties of the thus obtained uniaxially drawn film are shown in Table 1B.

Examples 3B and 4B

The transparent sheet obtained in Example 2B was biaxially drawn in 200% or 400% in both of the drawing directions. These biaxially drawn films were subjected to a thermal fixing treatment under tension at 210° C. for 20 seconds. The thus obtained biaxially drawn films are shown in Table 1B. Incidetally, the drawn film before the thermal fixing after 400% drawing in each of the length-wise and transverse directions had an elongation at break of 50% showing a great improvement over the undrawn sheet having an elongation at break of 2%. Comparative Example 1B Table 1B shows the physical properties determined of the undrawn sheet obtained in Example 2B.

Example 5B

A polystyrene having a weight-average molecular weight of 1,500,000 and syndiotacticity of 96% obtained in the same manner as in (1) of Example 1B was compounded with a fine powder of talc to give a content of 2% by weight and then shaped into a sheet at 280° C. using a calendering roller. Thereafter, the sheet was subjected to 350% drawing in the length-wise direction at 115° C. and then 250% drawing in the transverse direction at 118° C. Further, a thermal fixing treatment thereof was undertaken at 213° C. for 20 seconds. Table 1B shows the physical properties of the thus obtained biaxially drawn film.

Comparative Example 2B

Table 1B shows the physical properties of the undrawn sheet obtained in Example 5B Example 6B (1) Preparation of a styrene-based polymer A styrene-based polymer was prepared in just the same manner as in (1) of Example 1B.

(2) Preparation of a shaped article

The styrene-based polymer obtained in (1) described above was put into ethyl benzene as a solvent and dissolved with heating to give a solution of the styrene-based polymer in a concentration of 2% by weight. This solution was poured into a well chilled aluminum-made box to give an agar-like gel. This gel was freed from the liquid by suction on a Buchner funnel under pressing and then dried at room temperature for 24 hours under reduced pressure to give a gel plate In the next place, this gel plate was cut into a strip which was subjected to drawing at 130° C. in air in a drawing ratio of 800%. The thus obtained material as drawn was subjected to the measurement of mechanical strengths. The results are shown in Table 2B.

Example 7

(1) Preparation of a styrene-based polymer

The same procedure as in (1) of Example 1B was undertaken except that the polymerization temperature was set at 5° C. to give 2.8 g of a styrene-based polymer, i.e. polystyrene. The MIP thereof was 94% by weight. The thus obtained styrene-based polymer (MIP) had a weight-average molecular weight of 500,000, number-average molecular weight of 180,000 and syndiotacticity of 95%.

(2) Preparation of a shaped article

The same procedure as in (2) of Example 6B was undertaken excepting the use of the styrene-based polymer obtained in (1) described above. The results are shown in Table 2B.

Example 8B (1) Preparation of a styrene-based polymer

The same procedure as in (1) of Example 1B was undertaken except that the polymerization temperature was set at 30° C. to give 9.0 g of a styrene-based polymer, i.e. polystyrene. The MIP thereof was 99% by weight. The thus obtained styrene-based polymer (MIP) had a weight-average molecular weight of 1,800,000, number-average molecular weight of 650,000 and syndiotacticity of 98%.

(2) Preparation of a shaped article

The same procedure as in (2) of Example 6B was undertaken except that the styrene-based polymer obtained in (1) described above was used and the drawing ratio was 700%. The results are shown in Table 2B.

Example 9B (1) Preparation of a styrene-based polymer

The same procedure as in (1) of Example 1B was undertaken except that the polymerization temperature was set at 20° C. to give 4.0 g of a styrene-based polymer, i.e polystyrene. The MIP thereof was 92% by weight. The thus obtained styrene-based polymer (MIP) had a weight-average molecular weight of 2,400,000, number-average molecular weight of 860,000 and syndiotacticity of 100%.

(2) Preparation of a shaped article

The same procedure as in (2) of Example 6B was undertaken except that the styrene-based polymer obtained in (1) described above was used and the drawing ratio was 600%. The results are shown in Table 2B.

Example 10B (1) Preparation of a styrene-based polymer

The same procedure as in (1) of Example 1B was undertaken excepting the polymerization temperature at 0° C. and polymerization time of 8 hours to give 1.5 g of a styrene-based polymer, i.e. polystyrene. The MIP thereof was 70% by weight. The thus obtained styrene-based polymer (MIP) had a weight-average molecular weight of 4,500,000, number-average molecular weight of 1,600,000 and syndiotacticity of 100%.

(2) Preparation of a shaped article

The same procedure as in (2) of Example 6B was undertaken except that the styrene-based polymer obtained in (1) described above was used and the drawing ratio was 500%. The results are shown in Table 2B.

Comparative Example 3B

The same procedure as in (2) of Example 6B was undertaken excepting omission of the drawing treatment. The results are shown in Table 2B.

Comparative Example 4B 10.0 g of magnesium diethoxide were reacted with 50 ml of tetrachloro titanium to prepare a titanium compound. The mixture of 1.0 m mole of titanium catalytic ingredients supporting the above obtained titanium compound and 10 m mole of triethyl aluminum was used as the catalyst. Polymerization reaction of 100 ml styrene was conducted for 2 hours at 70° C. in heptane as a solvent to give 48.7 g of styrene-based polymer i.e. polystyrene, having isotactic structure and weight-average molecular weight of 1,000,000, number-average molecular weight of 260,000. This styrene-based polymer had the unextracted matter of 96% by weight, extracted by using methyl ethyl ketone by the same procedure as in (2) of the Example 1B. The above obtained styrene-based polymer having the isotactic structure was subjected to drawing in the same manner as in (2) of the Example 1B (drawing ratio of 600%). The thus obtained material as drawn was subjected to the measurement of the mechanical strengths. The results are shown in Table 2B.

Comparative Example 5B

The same procedure as in Comparative Example 4B was undertaken excepting omission of the drawing treatment. The results are shown in Table 2B.

Example 11B (1) Preparation of a styrene-based polymer

Into a reaction vessel were introduced 20 ml of toluene as a solvent and 0 0445 m mole of tetraethoxy titanium and 4.45 m moles as aluminum atoms of methyl aluminoxane as the catalytic ingredients and then 110 ml of styrene were added thereto at 20° C. to conduct the polymerization reaction for 7 hours. After completion of the reaction, the product was washed with a liquid mixture of hydrochloric acid and methyl alcohol to decompose and remove the catalytic ingredients. Subsequent drying gave 1.7 g of a styrene-based polymer, i.e. polystyrene The MIP thereof was 98% by weight. The thus obtained styrene-based polymer had a weight-average molecular weight of 3,040,000, number-average molecular weight of 1,220,000 and syndiotacticity of 99%.

(2) Preparation of a shaped article

The styrene-based polymer obtained in (1) described above was put into p-xylene as a solvent and dissolved with heating to give a 1% by weight solution of the styrene-based polymer. This solution was poured into a flat dish to give a rigid agar-like gel. This gel was washed with acetone and a gel mat was obtained by compression. This gel mat was cut into a strip which was dried at room temperature for 10 hours under reduced pressure This strip was subjected to drawing in a drawing ratio of 700% by the solid-phase coextrusion at 150° C. in air together with poly(4-methyl pentene-1). The thus obtained material as drawn was subjected to the measurement of the mechanical strengths. The results are shown in Table 2B.

Example 12B (1) Preparation of a styrene-based polymer

A styrene-based polymer was prepared in just the same manner as in (1) of Example 11B.

(2) Preparation of a shaped article

The styrene-based polymer obtained in (1) described above was put into chloroform as a solvent and dissolved with heating to give a solution of the styrene-based polymer in a concentration of 0.1% by weight. This solution was poured into a well chilled copper-made box to give an agar-like soft gel. This gel was freed from the liquid by suction on a Buchner funnel with compression and then dried at room temperature for 10 hours under reduced pressure to give a gel plate. In the next place, this gel plate was cut into a strip which was subjected to a drawing treatment in a drawing ratio of 700% at 150° C. in air by the solid-phase coextrusion together with poly(4-methyl pen- tene-1). Table 2B shows the mechanical strengths of the thus obtained material as drawn.

Example 13B (1) Preparation of a styrene-based polymer

The same procedure as in (1) of Example 11B was undertaken excepting the polymerization temperature at 50° C. and the polymerization time of 80 minutes to give 2.2 g of a styrene-based polymer. The MIP thereof was 97% by weight. The thus obtained styrene-based polymer had a weight-average molecular weight of 940,000, number-average molecular weight of 380,000 and syndiotacticity of 97%.

(2) Preparation of a shaped article

A film by casting was prepared from the styrene-based polymer obtained in (1) described above using chloroform as the solvent. This cast film was cut into a strip which was subjected to drawing in the same manner as in (2) of Example 11B to give a material as drawn in a drawing ratio of 700% Table 2B shows the mechanical strengths of the thus obtained material as drawn.

Example 14B (1) The method for the preparation of a styrene-based polymer

Into a reaction vessel were introduced 180 ml of toluene as a solvent and 0.15 m mole of tetraethoxy titanium and 15 m moles as aluminum atoms of methyl aluminoxane as the catalytic ingredients and then a mixture of 145 m moles of styrene and 15 m moles of p-methyl styrene was added thereto at 30° C. to conduct the polymerization reaction for 2 hours After completion of the reaction, the product was washed with a liquid mixture of hydrochloric acid and methyl alcohol to decompose and remove the catalytic ingredients. Subsequent drying gave 22 g of a styrene-based polymer. In the next place, this polymer was subjected to extraction in a Soxhlet extractor with methyl ethyl ketone as the solvent to give 9.9% by weight of the unextracted matter. This material had a weight-average molecular weight of 960,000, number-average molecular weight of 460,000 and melting point of 225° C. The content of the p-methyl styrene moiety therein was 23% by moles and absorption bands were found in the analysis by the $^{13}$C-NMR at 145 11 ppm, 145.22 ppm and 142.09 ppm indicating a co-syndiotactic structure similarly to the copolymer described in the specification of Japanese Patent Application 62-017973

(2.) Preparation of a shaped article

A gel plate was prepared in the same manner as in (2) of Example 12B excepting the use of the styrene-based polymer obtained in (1) described above and use of p-xylene as the solvent and a drawn material in a drawing ratio of 700% was obtained by drawing the same. Table 2B shows the mechanical strengths of the thus obtained material as drawn.

TABLE 1B

|  | Drawing ratio, % | | Temperature of thermal fixing, °C. | Tensile strength, kg/cm$^2$ (length-wise/ transverse) | Elastic modulus kg/cm$^2$ (length-wise/ transverse) | Temperature of thermal deformation, °C. *1 |
| --- | --- | --- | --- | --- | --- | --- |
|  | Length-wise direction | Transverse direction | | | | |
| Example 1B | 450 | — | 190 | 1200/500 | 101,000/30,000 | 183 |
| Example 2B | 450 | — | 210 | 1500/500 | 110,000/41,000 | 209 |
| Example 3B | 200 | 200 | 210 | 1050/1000 | 39,000/38,400 | 206 |
| Example 4B | 400 | 400 | 210 | 1200/1180 | 42,000/41,000 | 209 |
| Comparative Example 1B | — | — | — | 660/450 | 28,000/29,000 | 90 |
| Example 5B | 350 | 250 | 213 | 1400/1300 | 43,000/42,000 | 210 |
| Comparative Example 2B | — | — | — | 880/850 | 30,000/30,000 | 97 |

*1The temperature of thermal deformation was determined by the thermomechanical measurement (TMA).

TABLE 2B

|  | Styrene-base polymer | | | | |
| --- | --- | --- | --- | --- | --- |
|  | Weight-average molecular weight | Number-average molecular weight | Syndiotacticity % | Drawing ratio % | Elastic modulus kg/cm$^2$ |
| Example 6B | 1,350,000 | 480,000 | 96 | 800 | 240,000 |

TABLE 2B-continued

| | Styrene-base polymer | | | | |
|---|---|---|---|---|---|
| | Weight-average molecular weight | Number-average molecular weight | Syndiotacticity % | Drawing ratio % | Elastic modulus kg/cm$^2$ |
| Example 7B | 500,000 | 180,000 | 94 | 800 | 200,000 |
| Example 8B | 1,800,000 | 650,000 | 98 | 700 | 260,000 |
| Example 9B | 2,400,000 | 860,000 | 100 | 600 | 270,000 |
| Example 10B | 4,500,000 | 1,600,000 | 100 | 500 | 290,000 |
| Example 11B | 3,040,000 | 1,220,000 | 99 | 700 | 200,000 |
| Example 12B | 3,040,000 | 1,220,000 | 99 | 700 | 100,000 |
| Example 13B | 940,000 | 380,000 | 97 | 700 | 120,000 |
| Example 14B | 960,000 | 460,000 | — | 700 | 100,000 |
| Comparative Example 3B | 1,350,000 | 480,000 | 96 | — | 3,600 |
| Comparative Example 4B | 1,000,000 | 260,000 | 0 | 600 | 5,500 |
| Comparative Example 5B | 1,000,000 | 260,000 | 0 | — | 3,200 |

What is claimed is:

1. A syndiotactic polystyrene comprising
   (A) a styrene based polymer having a mainly syndiotactic configuration; and
   (B) 0.005 to 30 parts by weight, per 100 parts by weight of said polymer, of an antioxidant selected from the group consisting of a phosphorous containing antioxidant, a phenolic antioxidant or a combination thereof.

2. The syndiotactic polystyrene of claim 1 wherein said phosphorous containing antioxidant is a monophosphite or diphosphite or mixture thereof and the phenolic antioxidant is a dialkyl phenol, trialkyl phenol, diphenylmonoalkoxylphenol, a tetraalkyl phenol, or a mixture thereof.

3. The syndiotactic polystyrene of claim 2 wherein a mixture of phosphorus containing antioxidants and phenolic antioxidants in a ratio in the range of 100:1 to 0.3:1 is used.

4. The syndiotactic polystyrene of claim 1 wherein the antioxidant is a mixture of phosphorus containing antioxidants and phenolic antioxidants in a ratio in the range of 100:1 to 0.3:1.

5. The syndiotactic polystyrene of claim 1 comprising 0.005 to 5 parts by weight of the antioxidant.

6. The syndiotactic polystyrene of claim 5 wherein the polymer has a molecular weight of at least 10,000.

7. The syndiotactic polystyrene of claim 1 wherein the polymer has a molecular weight of at least 50,000.

8. The syndiotactic polystyrene of claim 1 wherein the polymer has a molecular weight of at least 100,000.

9. The syndiotactic polystyrene of claim 1 wherein the polymer has a molecular weight of at least 300,000.

10. The syndiotactic polystyrene of claim 1 which has at least 30% racemic pentad.

11. The syndiotactic polystyrene of claim 10 which has at least 50% racemic pentad.

12. The syndiotactic polystyrene of claim 1, wherein the polymer has a molecular weight of at least 100,000, at least 50% racemic pentad and a crystallinity of less than 25%.

13. The styrene-based resin composition of claim 1 wherein the phosphorus-containing antioxidant and the phenolic antioxidant are present in a total amount of 0.005 to 5 parts by weight per 100 parts by weight of the styrene-based polymer, and the weight ratio of the phosphorus-containing antioxidant to the phenolic antioxidant is 100:1 to 0.3:1.

14. The composition claim 13 wherein the antioxidant component (B) further contains a sulfur-containing antioxidant and the amount of the sulfur-containing antioxidant compounded is 0.0001 to 1 part by weight per 100 parts by weight of the styrene-based polymer.

15. The composition as claimed in claim 14 wherein the resin component (A) further contains rubber and the amount of the rubber compounded is 1 to 200 parts by weight per 100 parts by weight of the styrene-based polymer.

16. The composition of claim 14 wherein the resin component (A) further contains a thermoplastic resin and/or rubber, and the amount of the thermoplastic resin and/or rubber compounded is 1 to 200 parts by weight per 100 parts by weight of the styrene-based polymer.

17. The composition of claim 16, wherein the resin component (A) further contains a thermoplastic resin and the amount of the thermoplastic resin compounded is 1 to 200 parts by weight per 100 parts by eight of the styrene-based polymer.

18. A fibrous molding produced by spinning a styrene-based resin composition comprising (A) a styrene-based polymer having mainly a syndiotactic configuration as resin component and (B) a phosphorus-containing antioxidant and a phenolic antioxidant as antioxidant wherein the total amount of the phosphorus-containing antioxidant and the phenolic antioxidant is 0.01 to 30 parts by weight per 100 parts by weight of the styrene-based polymer, and the weight ratio of the phosphorus-containing antioxidant to the phenolic antioxidant is 100:1 to 0.3.

19. A molding produced by stretching a styrene-based resin composition comprising (A) a styrene-based polymer having mainly a syndiotactic configuration as resin component and (B) a phosphorus-containing antioxidant and a phenolic antioxidant as antioxidant wherein the total amount of the phosphorous-containing antioxidant and the phenolic antioxidant compounded is 0.005 to 5 parts by weight per 100 parts by weight of the styrene-based polymer, and the weight ratio of the phosphorus-containing antioxidant to the phenolic antioxidant is 100:1 to 0.3:1.

20. The molding as claimed in claim 19, wherein the resin component (A) further contains 0.005 to 10 parts by weight of a thermoplastic resin and/or rubber.

21. The molding as claimed in claim 19, wherein the styrene-based resin composition further contains 0.005 to 10 parts by weight of (C) an inorganic filler.

22. The molding as claimed in claim 20, wherein the styrene-based resin composition further contains (C) an inorganic filler and a thermoplastic resin and/or rubber and wherein the total amount of inorganic filler, thermoplastic resin and rubber is 0.005 to 10 parts by weight.

23. A stretched styrene-based resin molding as obtained by subjecting a styrene-based polymer having mainly syndiotactic configuration and a weight average molecular weight of at least 50,000 to uniaxial stretching of at least two times or to biaxial stretching of at least 1.2 times in each direction with a subsequent annealing at a temperature of 120° C. to 250° C.

24. The stretched styrene-based resin molding of claim 23, having heat resistance and such transparency that the haze is not more than 30%.

25. The stretched styrene-based resin molding of claim 23, having such electric insulating properties that the breakdown voltage at 25° C. is at least 30 kV/mm.

26. A shaped article of a styrene-based polymer prepared by drawing a styrene-based polymer having a weight-average molecular weight of at least 100,000 and a mainly syndiotactic structure and thereafter annealing the drawn polymer at a temperature of 120° C. to 250° C.

27. The shaped article of claim 26, wherein the styrene-based polymer has a stereospecificity of syndiotacticity of at least 85% in the racemic pentad as determined by the nuclear magnetic resonance spectrometric analysis with a carbon isotope.

28. The shaped article of claim 27, wherein the molecular weight is at least 300,000.

29. A process for producing a stretched styrene-based resin molding which comprises subjecting a styrene-based resin having mainly syndiotactic configuration and a weight average molecular weight of at least 50,000 to uniaxial stretching of at least two times or biaxial stretching of at least 1.2 times in each direction and thereafter, annealing the stretched resin at a temperature of 120° C. to 250° C.

30. The process of claim 29, wherein the weight average molecular weight is at least 100,000.

31. The process of claim 29, wherein the weight average molecular weight is at least 300,000 and the syndiotacticity is at least 85% in the racemic pentad.

32. A process for producing a stretched styrene-based resin molding which comprises heat melting a styrene-based resin having mainly syndiotactic configuration and a weight average molecular weight of at least 50,000, quenching the molten resin, then subjecting the quenched resin to uniaxial stretching at a draw of at least two times or biaxial stretching at a draw ratio of at least 1.2 times in each direction and thereafter, annealing the stretched resin temperature of 120° C. to 250° C.

33. The process as claimed in claim 32, wherein quenching rate is from 200 to 3° C./sec.

34. The process as claimed in claim 32, wherein the draw rate is 3 to 10 times.

* * * * *

UNITED STATES PATENT AND TRADEMARK OFFICE
CERTIFICATE OF CORRECTION

PATENT NO. : 5,166,238
DATED : November 24, 1992
INVENTOR(S) : Akikazu Nakano et al.

It is certified that error appears in the above-identified patent and that said Letters Patent is hereby corrected as shown below:

On the title page, Item [30],

The PCT information was omitted from the Foreign Application Priority Data, please add: --PCT   PCT/JP87/00891    11/17/87--, and the May 18, 1987 [JP] Foreign Application Number should read as follows: --62-118880--.

Signed and Sealed this

Sixteenth Day of November, 1993

Attest:

BRUCE LEHMAN

Attesting Officer          Commissioner of Patents and Trademarks